(12) United States Patent
Manninen

(10) Patent No.: US 9,593,450 B2
(45) Date of Patent: Mar. 14, 2017

(54) NON-WOVEN DOUBLE LAYER INDUSTRIAL TEXTILE ASSEMBLED FROM HEMMED PANELS

(71) Applicant: AstenJohnson, Inc., Charleston, SC (US)

(72) Inventor: Allan R. Manninen, Ontario (CA)

(73) Assignee: ASTENJOHNSON, INC., Charleston, SC (US)

( * ) Notice: Subject to any disclaimer, the term of this patent is extended or adjusted under 35 U.S.C. 154(b) by 0 days.

(21) Appl. No.: 15/101,807

(22) PCT Filed: Dec. 5, 2014

(86) PCT No.: PCT/CA2014/000866
§ 371 (c)(1),
(2) Date: Jun. 3, 2016

(87) PCT Pub. No.: WO2015/081418
PCT Pub. Date: Jun. 11, 2015

(65) Prior Publication Data
US 2016/0305069 A1    Oct. 20, 2016

(30) Foreign Application Priority Data

Dec. 6, 2013   (CA) ...................................... 2835951

(51) Int. Cl.
*D21F 1/00*      (2006.01)
*B32B 3/24*      (2006.01)
(Continued)

(52) U.S. Cl.
CPC .............. *D21F 1/0036* (2013.01); *B32B 3/26* (2013.01); *B65G 15/30* (2013.01); *D04H 13/00* (2013.01);
(Continued)

(58) Field of Classification Search
CPC ........ D21F 1/00; D21F 1/0027; D21F 1/0036; D21F 1/0045; D21F 1/0054; D21F 1/0063;
(Continued)

(56) References Cited

U.S. PATENT DOCUMENTS 2,005,979 A      6/1935   Milnes
3,162,567 A  *  12/1964   Heller ................... D21F 1/0063
                                                       428/597
(Continued)

FOREIGN PATENT DOCUMENTS

CA     2688168 A1  *  6/2011  ........... D21F 1/0054
CA     2688470 A1     6/2011
(Continued)

OTHER PUBLICATIONS

Machine translation (J-PlatPat) of JP 2000-044026 A. Translated Sep. 9, 2016.*
(Continued)

*Primary Examiner* — Maria Veronica Ewald
*Assistant Examiner* — Ethan A Utt
(74) *Attorney, Agent, or Firm* — Christopher & Weisberg, P.A.

(57) ABSTRACT

Nonwoven double layer industrial textiles comprising a plurality of interconnected selectively slit and profiled folded panels formed from suitable sheet or film materials. Each panel includes two fold regions having an array of slots and seaming loops. The folded panel is formed by folding each fold region toward the panel body, thereby providing seam loops and seam loop receiving openings, which are used to connect adjacent folded panels in a given layer of the textile. Two such layers are bonded together in overlapping relation such that outside free edges of any of the fold regions are returned and sealed interior to the double layer.

(Continued)

Further panels composed of heat or wear resistant material can be connected to lateral outside edges of panels forming the textile.

20 Claims, 20 Drawing Sheets

(51) Int. Cl.
| | |
|---|---|
| F16G 3/04 | (2006.01) |
| B32B 3/26 | (2006.01) |
| D21F 7/10 | (2006.01) |
| D21F 7/08 | (2006.01) |
| D04H 13/00 | (2006.01) |
| B65G 15/30 | (2006.01) |

(52) U.S. Cl.
CPC .......... *D21F 1/0054* (2013.01); *D21F 1/0063* (2013.01); *D21F 7/08* (2013.01); *D21F 7/10* (2013.01); *F16G 3/04* (2013.01)

(58) Field of Classification Search
CPC ... D21F 1/10; D21F 7/08; D21F 7/083; D21F 7/10; D21F 7/12; F16G 3/02; F16G 3/04; B32B 3/24; B32B 3/26; B32B 3/266; B65G 15/30–15/58; D04H 13/00; D04H 13/001–13/008; Y10T 428/24273–428/24347
USPC .................................................. 428/131–140
See application file for complete search history.

(56) References Cited

U.S. PATENT DOCUMENTS

| | | | |
|---|---|---|---|
| 3,309,790 A | 3/1967 | MacBean | |
| 3,324,991 A * | 6/1967 | Voss ......................... | F16G 3/02 198/844.2 |
| 3,530,898 A * | 9/1970 | Wilson .................. | F16L 59/021 138/167 |
| 9,303,356 B2 * | 4/2016 | Manninen .............. | D21F 1/0036 |
| 9,334,606 B2 * | 5/2016 | Manninen .............. | D21F 1/0054 |
| 9,358,752 B2 * | 6/2016 | Manninen ................ | B32B 3/266 |
| 2008/0295306 A1 * | 12/2008 | Despault .............. | D21F 1/0054 28/142 |
| 2012/0244311 A1 * | 9/2012 | Manninen ............... | B32B 3/266 428/133 |
| 2014/0199510 A1 * | 7/2014 | Manninen ............. | D21F 1/0054 428/136 |
| 2014/0308476 A1 * | 10/2014 | Manninen ............. | D21F 1/0054 428/138 |
| 2015/0132524 A1 * | 5/2015 | Manninen ............... | B32B 3/266 428/43 |
| 2015/0167215 A1 * | 6/2015 | Manninen ............. | D04H 13/00 428/132 |
| 2015/0247280 A1 * | 9/2015 | Manninen ............. | D21F 1/0036 428/122 |
| 2015/0267348 A1 * | 9/2015 | Manninen ............. | D21F 1/0036 428/137 |
| 2016/0039171 A1 * | 2/2016 | Manninen ............. | D21F 1/0072 428/137 |

FOREIGN PATENT DOCUMENTS

| | | | | |
|---|---|---|---|---|
| CA | 2738918 A1 | 6/2011 | | |
| CA | 2749477 A1 | 2/2013 | | |
| CA | WO 2013023272 A1 * | 2/2013 | ........... | D21F 1/0054 |
| CA | WO 2013071419 A1 * | 5/2013 | ........... | D21F 1/0054 |
| CA | 2779131 p A1 | 12/2013 | | |
| CA | WO 2013181748 A1 * | 12/2013 | ............. | D04H 13/00 |
| CA | WO 2013188964 A1 * | 12/2013 | ............. | B32B 3/266 |
| CA | 2791864 A1 | 4/2014 | | |
| CA | WO 2014053055 A1 * | 4/2014 | ........... | D21F 1/0036 |
| CA | WO 2014075170 A1 * | 5/2014 | ........... | D21F 1/0054 |
| CA | WO 2014153644 A1 * | 10/2014 | ........... | D21F 1/0072 |
| DE | 102008000123 A1 | 7/2009 | | |
| GB | 1086199 | 10/1967 | | |
| GB | 2432337 A | 5/2007 | | |
| JP | 2000044026 A * | 2/2000 | | |
| WO | 91/14884 A1 | 10/1991 | | |
| WO | 2005/042836 A2 | 5/2005 | | |
| WO | 2009/032271 A2 | 3/2009 | | |

OTHER PUBLICATIONS

Machine translation (J-PlatPat) of JP 2000-044026 A1. Translated Sep. 9, 2016.*
International Search Report and Written Opinion dated Mar. 6, 2015 for International Application Serial No. PCT/CA2014/000866, International Filing Date: Dec. 5, 2014, consisting of 14 pages.

* cited by examiner

NON-WOVEN DOUBLE LAYER INDUSTRIAL TEXTILE ASSEMBLED FROM HEMMED PANELS

CROSS-REFERENCE TO RELATED APPLICATIONS

This application is a Submission under 35 U.S.C. §371 for U.S. National Stage Patent Application of, and claims priority to, International Application Number PCT/CA2014/000866, filed Dec. 5, 2014, entitled "NON-WOVEN DOUBLE LAYER INDUSTRIAL TEXTILE ASSEMBLED FROM HEMMED PANELS", which is related to and claims priority to Canadian Patent Application Number 2,835,951, filed Dec. 6, 2013, the entire contents of both of which are hereby incorporated herein by reference.

TECHNICAL FIELD

The present article relates to industrial textiles. In particular, it relates to a double-layered non-woven industrial textiles, and panels used in the assembly thereof.

BACKGROUND

Non-woven industrial textiles formed from one or more layers of sheet or film materials are known and have been described in U.S. Pat. No. 8,454,800 (Mourad et al.); U.S. Pat. No. 8,394,239 and U.S. Pat. No. 8,388,812 (both to Eagles et al); U.S. Patent Application Publication No. 2013/0081772 (Eagles et al); U.S. Patent Application Publication No. 2012/0027997 (Mourad et al); U.S. Patent Application Publication No. 2012/0021171 (Riviere et al); U.S. Patent Application Publication No. 2011/0272112 (Aberg et al); U.S. Patent and Application Publication No. 2010/0239814 (Mourad et al), for example.

These known industrial textiles can be formed from a polymeric film which is drilled with a cutting device, such as a laser, to provide through apertures that allow for porosity throughout the assemblies. Alternatively, the non-woven textiles can be produced by spirally winding strips of polymeric material, such as an industrial strapping or ribbon material, and joining the adjoining sides of the strips of material using ultrasonic welding or laser welding techniques. A non-woven textile formed in this manner is subsequently perforated to make it permeable to air and/or water. However, such textiles are not easily seamed, and, there is no internal structure which helps to maintain a separation and void volume between layers of panels. As such, it is difficult to provide flow paths for both water and air to permeate throughout the textile.

Further examples include U.S. Pat. No. 8,784,615 (Straub), U.S. Pat. No. 8,815,057 (Eberhardt et at), U.S. Patent Application Publication No. 2012/0021178 (Miller et al); and PCT Patent Application Publication Nos. WO 2005/042836 (Sayers); WO 2008/145420 (Bez et al); WO 2014/001172, WO 2013/010678 and WO 2012/123439 (all to Straub et at) disclose various arrangements to provide a continuous belt for use as an industrial textile, particularly as a papermaking fabric. The latter is formed from strips of a perforated film material joined edge to edge. However, such arrangements may not provide adequate flexibility and permeability throughout the entire non-woven industrial textile. Furthermore, the component strips are difficult to assemble and seam.

U.S. Pat. No. 8,563,114 (Manninen) discloses an industrial textile formed from two interconnected layers of a polymer film. Each layer is contoured by embossing or similar process to raise portions of the film; and cutting slits through the film to create apertures in the raised portions. This arrangement allows for the passage of fluid (for example, liquid drainage or air passage) through the textile. U.S. Pat. No. 8,563,114 further discloses that the central body portion of each strip of film can be selectively slit and embossed to provide a plurality of regularly arranged protrusions extending from a first planar surface of the film outwardly from the opposing second surface and in which the apertures are located. The resulting fabric is formed from a plurality of similarly profiled strips interconnected to provide a two layer film assembly; the strips are either lap or butt joined along the longitudinal side edges by a welding or similar bonding process, or are interconnected by inserting a filamentary material across their width through aligned apertures passing through arrays of similar protrusions. The resulting textile is then rendered endless and seamed using a seaming element such as described in U.S. Patent Application Publication No. 2012/0040150 (Manninen).

It would be desirable if the component strips used in the construction of industrial textiles as described by U.S. Pat. No. 8,563,114 could be joined in a manner such that the edges of the strips could be removed from the wear plane of the textile and thus not exposed to abrasion or fraying due to their passage over various stationary elements in the machine or process in which the textile is to be used.

It has now been found that selectively slit and profiled panels can be formed from a single layer of a profiled planar material and interconnected in a novel manner to shield the lateral edges from machine elements. The panels are structured and arranged so as to maintain a separation and void volume between the two assembled layers of panels. The configuration of the panels provides for interior join areas within the panel assembly. In this manner, free ends at the edges of, or in between, any two panels in each layer, are located interior to the double layer assembly so as to avoid fraying or entanglement.

In such an arrangement, the industrial textile has flexibility and porosity that is similar to that of a woven textile. In addition, since each individual panel is selectively slit and profiled before interconnection with another panel, subsequent perforation steps are not required.

SUMMARY

In one aspect of the present invention, there is provided a panel for use in construction of a non-woven industrial textile, the panel comprising: a) an outer surface and an inner surface; b) first and second fold regions, the first fold region located at a first end of the panel, the second fold region located at a second end of the panel, each fold region comprising: i) an outer edge of the panel; ii) an edge region; iii) a column of loop strips and slots, the column oriented parallel to the outer edge and set adjacent the edge region; and iv) a fold line substantially midway through the column of loop strips and slots, oriented parallel to the outer edge; and c) a body region between the first and second fold regions; wherein the panel is folded along each fold line such that each edge region is oriented towards the inner surface of the panel, thereby forming a folded panel in which each loop strip forms a seam loop, and each slot forms a seam loop-receiving opening for receipt of a seam loop of an folded adjacent panel.

The inner surface of the body region can comprise a plurality of protrusions, with a land area between each protrusion. In addition, the plurality of protrusions may be arranged in a series of columns parallel to the column of loop strips and slots in each fold region. With reference to the structure of the protrusions, each protrusion can include one or more of the following: a surface parallel to the inner surface of the panel; and at least one lateral aperture. In some instances, each protrusion can include two lateral apertures. Each lateral aperture helps to provide a flow path for fluid and/or air to pass between the outer surface and the inner surface of the panel.

With reference to other parts of the panel, each slot can be dimensioned to receive at least one of the protrusions. Furthermore, each slot may be aligned with a corresponding protrusion proximate the fold region.

Once the panel is in the folded position, each edge region can either be secured to the inner surface of the panel itself; or each fold region may be folded into a U-shape, and the corresponding edge region is then secured to a different panel that is directly opposite.

When the fold region is folded into a U-shape, additional stability can be imparted to the folded panel by securing a spacer member within at least one fold region of the panel.

With reference to panel composition, the panel may comprise a thermoplastic material, a thermoset material or a formable metal.

The thermoplastic material can be selected from the group consisting of a polyester, a polyamide, a polyolefin, a polyphenylene sulfide and a polyaryletherketone. Where the panel comprises a thermoplastic material, it may also comprise an additive, a radiant-energy absorbent material, or a combination thereof. As an example, the radiant-energy absorbing material can be carbon black. When the panel comprises a thermoplastic material, it may include at least one layer of a film comprising material selected from the group consisting of polyethylene terephthalate (PET), polybutylene terephthalate (PBT), polyethylene (PE), polyethylene naphthalate (PEN), polypropylene (PP), polyphenylene sulphide (PPS), polyether ether ketone (PEEK), poly(cyclohexylene dimethylene terephthalate) acid (PCTA), polyamide-6 (PA-6), PA-6/6, PA-6/10 and PA-6/12. As an example, the film can comprise a bi-axially oriented, hydrolysis-stabilized PET film. In addition, the at least one layer of the film can include an additive, a radiant-energy absorbent material, or a combination thereof. If a spacer member is used within at least one of the fold regions of the panel, then it can be secured by laser welding, for example, by through transmission laser welding (TTLW).

The formable metal material can be selected from the group consisting of an aluminum alloy, brass, cold rolled steel, copper, galvanized steel, high-strength low alloy steel, hot rolled steel, steel alloy, stainless steel zinc and any combination thereof.

The thermoset material can be a linear polyimide or an aromatic heterocyclic polyimide.

Whatever the composition of the panel, at least part of the outer surface of the panel can have surface roughness, in order to minimize adherence of contaminants to the panel. The surface roughness can be any type of roughness known in the art that is between 5µ and 100µ. As an example, this can include striations on either a portion or the entire outer surface of the panel.

In another aspect of the present invention, there is provided a double-layer non-woven industrial textile having a first layer opposite a second layer, the first layer and the second layer each assembled from a plurality of folded panels secured adjacently in series, wherein: a) each folded panel comprises a body region in between two fold regions, the first fold region located at a first end of the folded panel, the second fold region located at a second end of the folded panel, the body region comprising a plurality of protrusions on an inner surface of the folded panel; and each fold region having a plurality of seam loops and seam loop-receiving openings; b) adjacent folded panels are interconnected at a seam region, the seam region formed by insertion of the seam loops of a first folded panel into the seam loop-receiving openings of a second folded panel and the seam loops of the second folded panel into the seam loop-receiving openings of the first folded panel, thereby forming a seam channel at the seam region; c) a central portion of the body region of each folded panel in the first layer overlaps a seam region in the second layer and a central portion of the body region of each folded panel in the second layer overlaps a seam region in the first layer; d) adjacent folded panels are secured to each other by: i) insertion of a connecting member in the seam channel between the adjacent folded panels; and/or ii) securing: an edge region of each fold region in the first layer to the inner surface of the second layer; and an edge region of each fold region in the second layer to the inner surface of the first layer; and e) the first and second layers are secured together by at least one of: i) securing a plurality of protrusions in the first layer with opposite land areas in the second layer; and ii) securing a plurality of protrusions in the second layer with opposite land areas in the first layer.

The first and second layers of the double-layer non-woven industrial textile can be secured as follows: each fold region in the first layer is bonded to the inner surface of the first layer and each fold region in the second layer is bonded to the inner surface of the second layer, and adjacent folded panels are secured to each other by insertion of the connecting member in the seam channel between the adjacent folded panels. The connection member can be selected from the group consisting of a pin, a monofilament, a pintle, a multifilament, and a metal wire.

Alternatively, the first and second layers of the double-layer non-woven industrial textile can be secured as follows: each fold region is folded into a U-shape and adjacent folded panels are secured to each other by securing: a) the edge region of each fold region in the first layer to the inner surface of the second layer; and b) the edge region of each fold region in the second layer to the inner surface of the first layer. In such an arrangement, a spacer member can be secured within at least one fold region.

The first and second layers can be further secured together by insertion of foam in between the first and second layers. The foam can be a porous open cell foam or a closed cell foam.

If each protrusion has a pair of lateral apertures, the first and second layers can also be secured together by a filamentary element that passes through aligned apertures of a column of protrusions in the first layer staggered with a column of protrusions in the second layer.

The composition of each of the folded panels is as described above.

When each folded panel comprises a thermoplastic, then a chemical method, a thermal method, a mechanical method, or a combination thereof can be used to secure the various components of each folded panel. Furthermore, if a folded panel further comprises an additive, a radiant-energy absorbent material, or a combination thereof, then laser welding (such as TTLW) can be used to secure components of each folded panel. As an example, the radiant-energy absorbing material may be carbon black.

If, however, each folded panel comprises a formable metal, then a chemical method, a thermal method, a mechanical method, or a combination thereof may be used to secure components of each folded panel.

Alternatively, if each folded panel comprises a thermoset material, then a chemical method, a mechanical method, or a combination thereof can be used to secure components of each folded panel.

It is possible to construct a double-layer non-woven industrial textile, in which the regions close to the lateral edges of the textile have physical properties that differ from interior regions of the textile. For example, in the construction of the textile as described above, additional exterior folded panels are secured to at least one of the first and second lateral edges of each folded panel, and the material of the additional exterior folded panels is different from the material of each folded panel. For example, the additional exterior folded panels can comprise a heat-resistant material or wear-resistant material. The heat-resistant or wear-resistant material can be PPS, PEEK, a formable metal or a hydrolysis-stabilized thermoplastic material.

In another aspect of the present invention, there is provided a panel for use in construction of a non-woven industrial textile, the panel comprising: a) an outer surface and an inner surface; b) first and second fold regions, the first fold region located at a first end of the panel, the second fold region located at a second end of the panel, each fold region comprising: i) an outer edge of the panel; ii) an edge region; iii) column of loop strips and slots, the column oriented parallel to the outer edge and set adjacent the edge region; and iv) a fold line substantially midway through the column of loop strips and slots, oriented parallel to the outer edge; and c) a body region between the first and second fold regions; wherein: the panel is folded along each fold line such that each edge region is oriented towards the inner surface of the panel, thereby forming a folded panel in which each loop strip forms a seam loop, and each slot forms a seam loop-receiving opening for receipt of a seam loop of an adjacent folded panel; the inner surface of the body region comprises a plurality of protrusions, each protrusion having at least one aperture; and a land area between each protrusion; and the panel comprises at least one layer of polymer film of oriented PET which includes a radiant-energy absorbing material. In addition, the polymer film may be biaxially oriented and/or hydrolysis stabilized.

As an example, the panel can comprise at least two co-extruded layers of polymer film, with one of the at least two co-extruded layers including a radiant energy absorbing material, which, for example, can be carbon black.

DETAILED DESCRIPTION

The detailed description set forth below in connection with the drawings is intended as a description of embodiments of a panel and double-layered non-woven industrial textile (constructed from these panels) and is not intended to represent the only forms in which the panel may be constructed or utilized. It is to be understood that the same or equivalent functions and structures may be accomplished by different embodiments that are also intended to be encompassed within the spirit and scope of the invention. As denoted elsewhere herein, like element numbers indicate like elements or features.

Panel

Figure 1A:
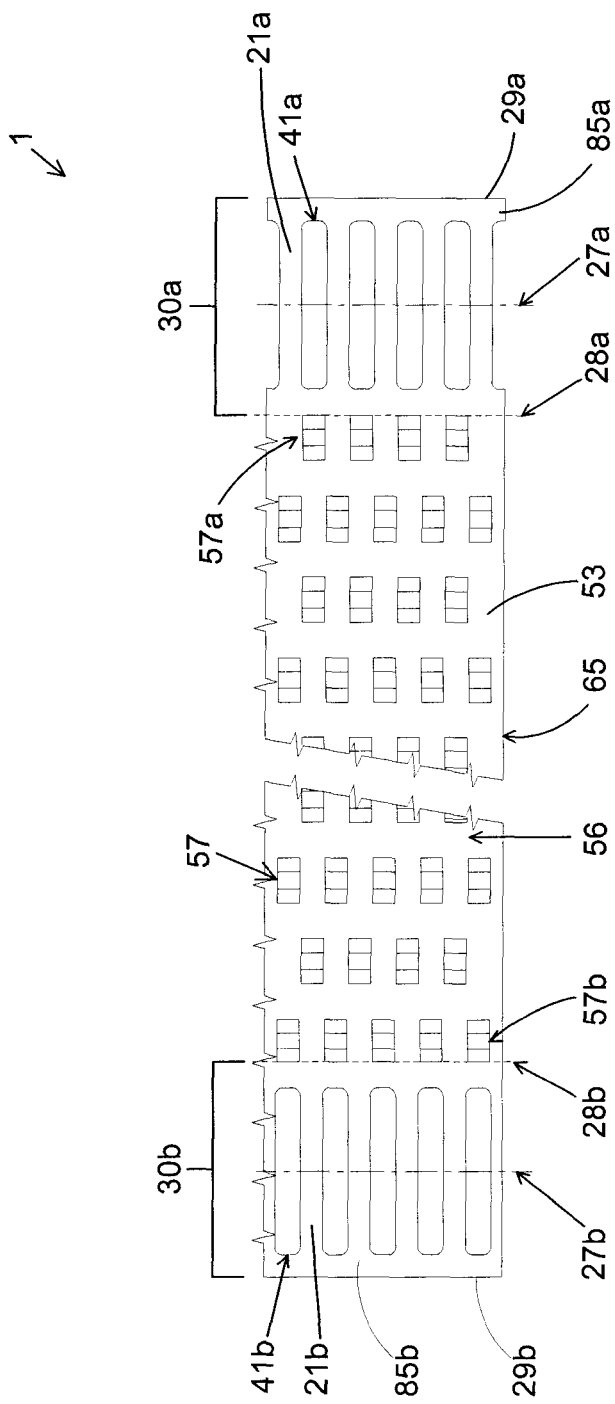
FIG. 1A is a top view of a first embodiment of a panel for use in the construction of a non-woven double-layer industrial textile.

FIG. 1A illustrates an embodiment of a panel (1) used in the construction of a double-layer non-woven textile. Henceforth, the expression "double-layer non-woven textile" will be referred to simply as "textile".

In this embodiment, the panel (1) is slit and embossed (i.e. "profiled"). Panel (1) includes first and second fold regions (30a, 30b) and a body region (65). Each of the fold regions (30a, 30b) is located at each end of the panel (1).

The body region (65) is defined as a region of the panel (1) between first and second inner edges (28a, 28b). Fold region (30a) is defined as a region of the panel (1) between first inner edge (28a) and first outer edge (29a) of the panel (1). Similarly, fold region (30b) is defined as a region of the panel (1) between second inner edge (28b) and second outer edge (29b) of the panel (1).

Figure 1B:
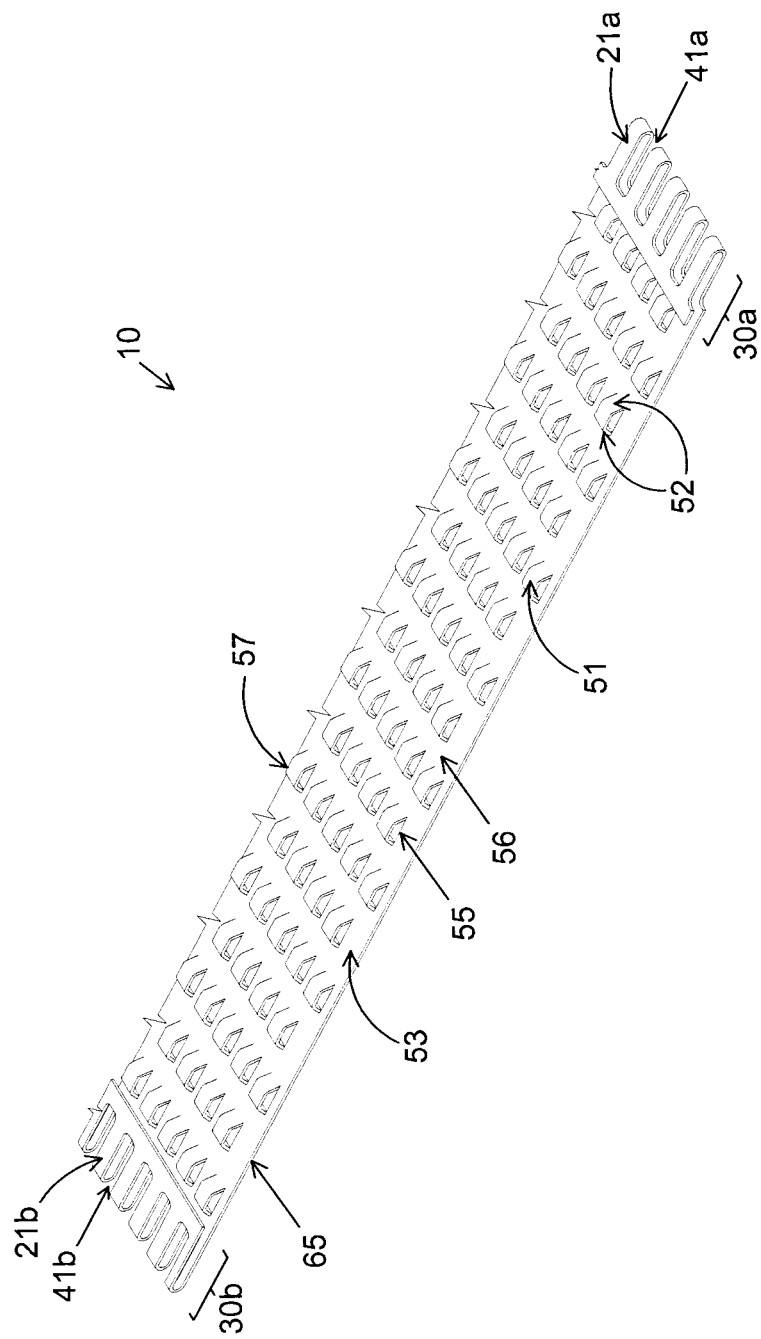
FIG. 1B is a perspective view of a folded panel formed by folding the panel shown in FIG. 1A.

Body region (65) includes a plurality of protrusions (57); as shown in FIG. 1B, these protrusions (57) project outwardly from an inner surface of panel (1). Henceforth, the term "inner surface" in relation to a panel, refers to that surface from which the protrusions are outwardly directed. The other side of the panel (which contain depressions) is referred to as the "outer surface".

In FIGS. 1A and 1B, protrusions (57) are arranged in a series of columns, each of which is parallel to inner edges (28a) and (28b). In the embodiment shown in FIGS. 1A and 1B, adjacent columns of protrusions (57) are staggered, resulting in a 1-2 repeat pattern of columns across the width of the body region (65). Each protrusion (57) is separated from an adjacent protrusion by a generally planar land area (53); each column of protrusions (57) is separated from an adjacent column by a land channel (56).

Referring to FIG. 1A, protrusions (57a) and (57b) refer to those protrusions proximate their respective fold region (30a) and (30b) along inner edge (28a) and (28b), respectively. While the column of protrusions (57a) is staggered relative to the column of protrusions (57b), it is understood that both columns (57a, 57b) can be aligned.

Referring to FIG. 1B, protrusions (57) can include apertures (55) formed by a precision slitting process. Each protrusion (57) includes a surface (51) supported by side surfaces (52), and apertures (55) on both lateral sides of the protrusion (57).

Apertures (55) allow for movement of fluid and/or air through the panel (1), while also allowing for the insertion of a continuous filamentary material through the protrusions (57), as described below. In this embodiment, body region (65) forms a continuous profiled surface that allows for the passage of fluid and/or air through panel (1) via apertures (55).

While a series of columns of protrusions is described in this embodiment, it is understood that other arrangements of protrusions are possible, provided the arrangements are regular and can either be offset or aligned. Examples of suitable embossing patterns and protrusions shapes are disclosed in WO 2013/188964, WO 2013/181748 and WO 2014/053055, all of which incorporated by reference.

Referring to FIG. 1A, each fold region (30a, 30b) includes a regular array (or column) of slots (41a, 41b), a series of loop strips (21a, 21b), a fold line (27a, 27b) and an edge region (85a, 85b). Each of these items is further described below.

Slots (41a, 41b) are set back from the inner edge (28a, 28b) and the outer edge (29a, 29b). As such, there is an edge region (85a, 85b) between the slots (41a, 41b) and the outer edge (29a, 29b). While four to five slots (41a, 41b) are shown in FIGS. 1A and 1B, it is understood that the number of slots in each fold region (30a, 30b) can vary. Loop strips (21a, 21b) are adjacent each slot (41a, 41b). In the embodiment shown in FIGS. 1A and 1B, each slot (41a, 41b) is aligned with a protrusion (57a, 57b) adjacent the inner edge (28a, 28b). Furthermore, slots (41a, 41b) are dimensioned so as to receive corresponding loop strips (21a, 21b) from an adjacent panel, and receive protrusions from a panel above/below during panel assembly, as will be described below.

Edge regions 85a and 85b each serve to: (i) stabilize and maintain spatial parallel relationship of their respective loop strips (21a, 21b); and (ii) optionally provide a surface area for use in bonding their respective fold regions (30a, 30b) to a planar surface of the same or an opposing panel, as described below.

Panel (1) of FIG. 1A is folded into folded panel (10) of FIG. 1B, for use in the assembly of a textile as follows.

As illustrated in FIG. 1B, fold region (30a) is folded about the fold line (27a), towards the protrusions (57) on the inner surface of body region (65), resulting in a horizontal "U" shape. In the process, loop strips (21a) form seam loops (21a), while slots (41a) form seam loop-receiving openings (41a). Both the seam loops (21a) and seam loop receiving openings (41a) are used for interconnection of folded panel (10) with an adjacent folded panel, as described below. While folding fold region (30a) into a horizontal "U" shape, outer edge (29a) is brought towards, and above inner edge (28a), so that edge region (85a) is parallel to the plane of body region (65). Similar manipulations are made to fold region (30b). The vertical thickness of the "U" fold is approximately equal to the height of protrusions (57). The result is folded panel (10).

Figure 2:
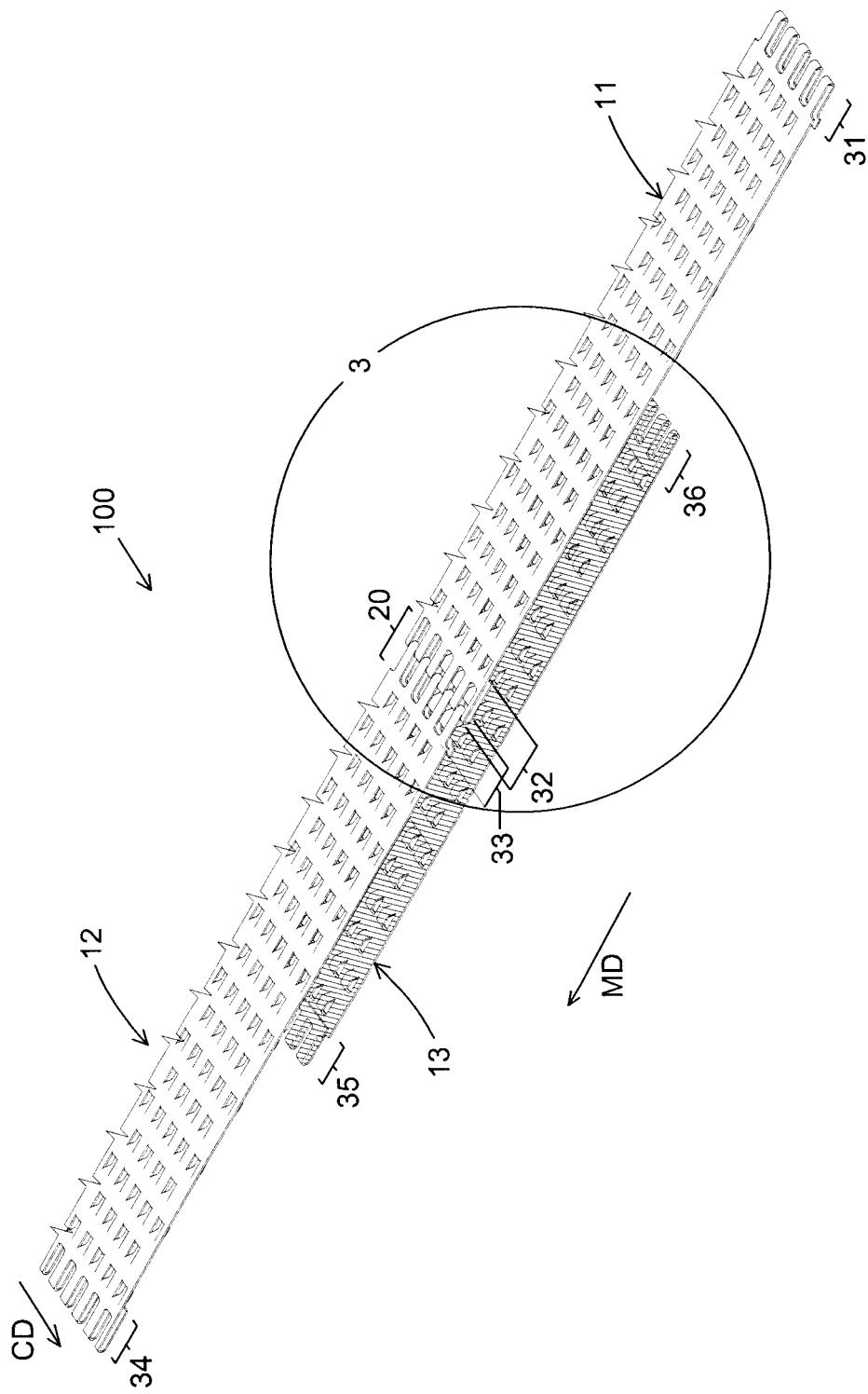
FIG. 2 is an exploded perspective view of three folded panels (each constructed as shown in FIGS. 1A and 1B) used in the construction of a non-woven double-layer industrial textile.

FIG. 2 is an exploded perspective view of three folded panels (11), (12) and (13) used in the construction of textile (100). Each panel has the same construction as that of folded panel (10) shown in FIG. 1B. Upper folded panels (11) and (12) are interconnected at seam region (20), while the inner surface of the body region of folded panel (13) is located beneath the seam region (20). Seam region (20) is placed approximately above the midpoint of the body region of folded panel (13). The inner surface of folded panel (13) faces the inner surface of each of folded panels (11) and (12).

Seam region (20) includes fold region (32) of folded panel (11) and fold region (33) of folded panel (12). The loops and loop-receiving openings of fold regions (32) and (33) overlap to form a channel, which may be used for the receipt of a connecting member that secures folded panels (11) and (12) together. This is discussed in further detail below. Folded panel (11) can also be connected to an adjacent panel (not shown) via identical loops and loop-receiving openings at fold region (31). This also applies for folded panel (12) at fold region (34), and folded panel (13) at fold regions (35) and (36). Details of the seam region and interconnection between adjacent folded panels (11) and (12) are discussed below.

In FIG. 2, folded panels (11), (12) and (13) are arranged such that seam region (20) is oriented parallel to the cross-machine direction (CD) once the assembled textile is in use. When assembled in a textile, each folded panel may extend the full CD breadth of the textile. However, the length of each folded panel (11, 12, 13) in the machine direction (MD) is fixed and is determined by the length of the panel. The length of the textile in the MD, on the other hand, can be varied by interconnecting a number of adjacent folded panels in series, as required, to achieve the desired industrial textile MD length. Each folded panel (11), (12) and (13) may have a CD breadth of as much as 10 m, or more, depending on the intended use, and an MD length of about 1 m.

Figure 3:
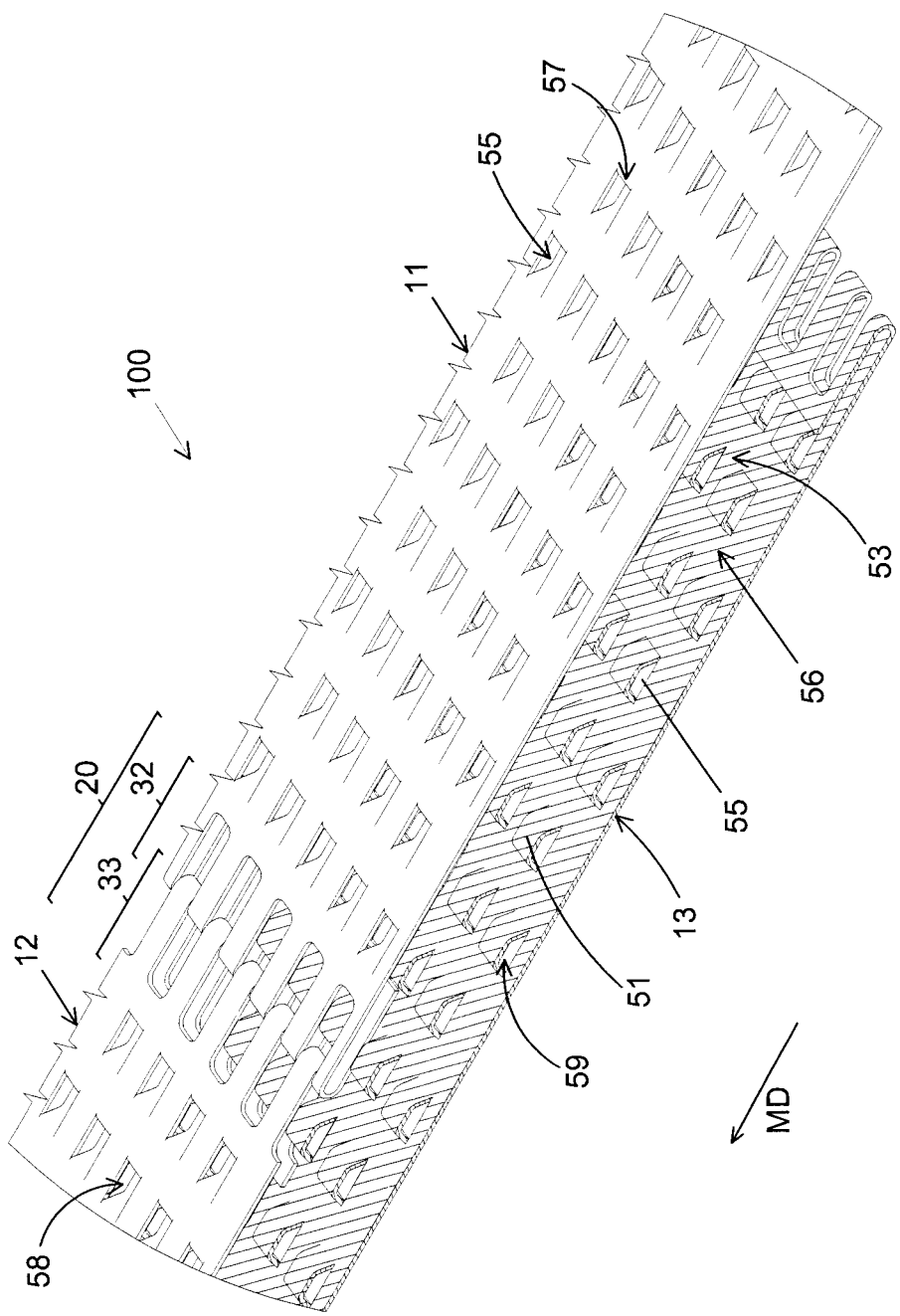
FIG. 3 is an enlarged view of the circled area 3 of FIG. 2.

FIG. 3 is an enlarged view of the circled area 3 of FIG. 2. The inner surface of folded panel (13) is brought into engagement with the inner surface of folded panels (11) and (12) such that a column of protrusions (59) (of folded panel (13)) engages in a staggered manner with corresponding columns of protrusions (57) and protrusions (58), of folded panels (11) and (12), respectively. In particular, as the upper and lower layers of the folded panels are brought together, the surface (51) of each protrusion (59) will be in contact with a land area between the protrusions of the upper folded panels (11) and (12). Similarly, surface (51) of protrusions

(57) and (58) will be in contact with land areas (53) between the protrusions (59) of folded panel (13). In this configuration, side apertures (55) of each of the protrusions (57, 58, 59) become aligned to provide a flow path from the outer surface of folded panels (11) and (12) through to the outer surface of lower folded panel (13), while land channels (56) remain open and unobstructed across the breadth of the textile (see FIG. 6, for example). In this arrangement, the protrusions surfaces (51) and side surfaces (52) support the opposing folded panel layers under compressive loads, while maintaining an open space, or void volume, between an upper layer and a lower layer of the textile (100). This configuration is shown in greater detail in FIG. 5A.

FIG. 3 also illustrates the seam region (20) between panels 11 and 12 in relation to mating folded panel (13). Seam loops, such as (21a, 21b) shown in FIG. 1B, are mutually engaged by an overlap of fold regions (32) and (33). In addition, seam loop receiving openings, such as (41a, 41b) in FIG. 1B, are dimensioned so as to receive protrusions (59) from folded panel (13) from below. This is described in greater detail with reference to FIGS. 7, 7A and 7B below.

With reference to FIG. 3, protrusions (57, 58, 59) form depressions in the outer surface of each folded panel (11, 12, 13).

Figure 4:
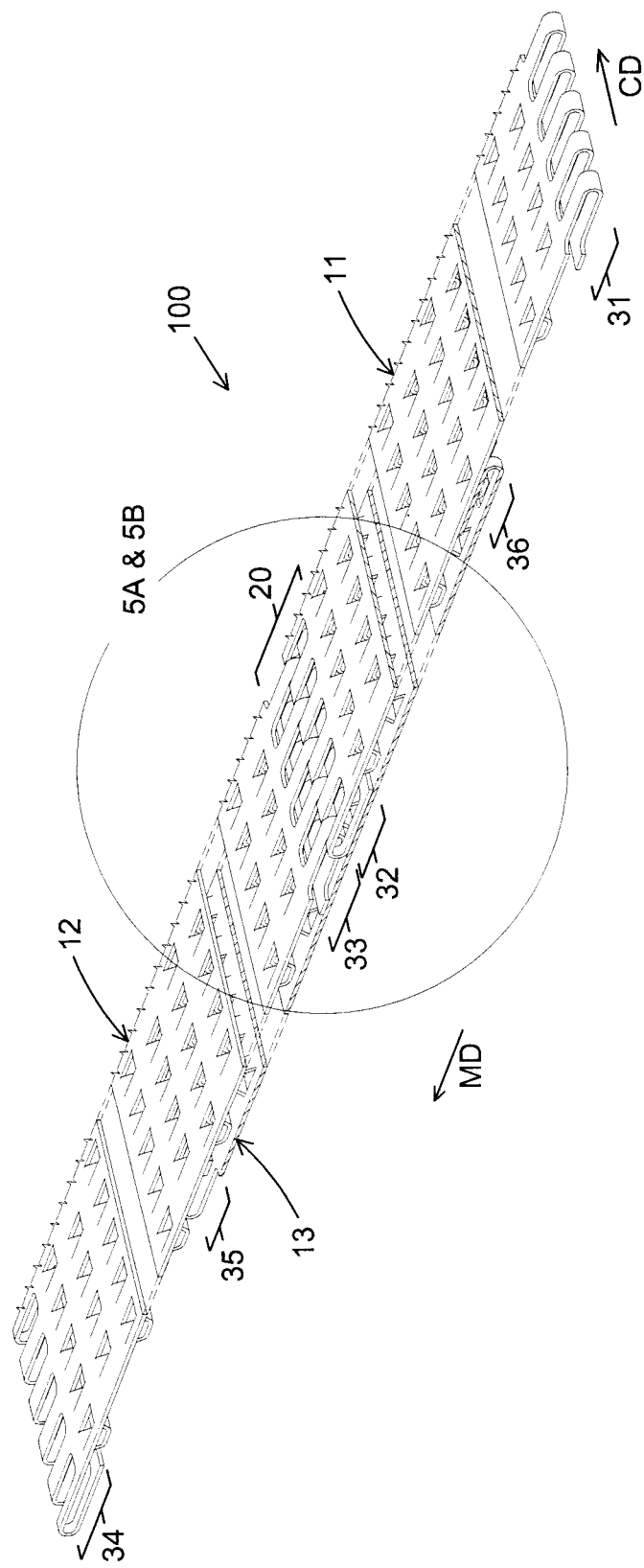
FIG. 4 is a perspective view of the three assembled folded panels shown in FIG. 2.

FIG. 4 is a perspective view of the three assembled folded panels shown in FIG. 2. Interconnected folded panels (11), (12) and (13) are oriented and dimensioned so that each folded panel extends over the CD breadth of the textile (100). A sufficient number of panels are interconnected in the MD direction, in order to achieve a desired MD length of the textile (100).

Figure 5A:
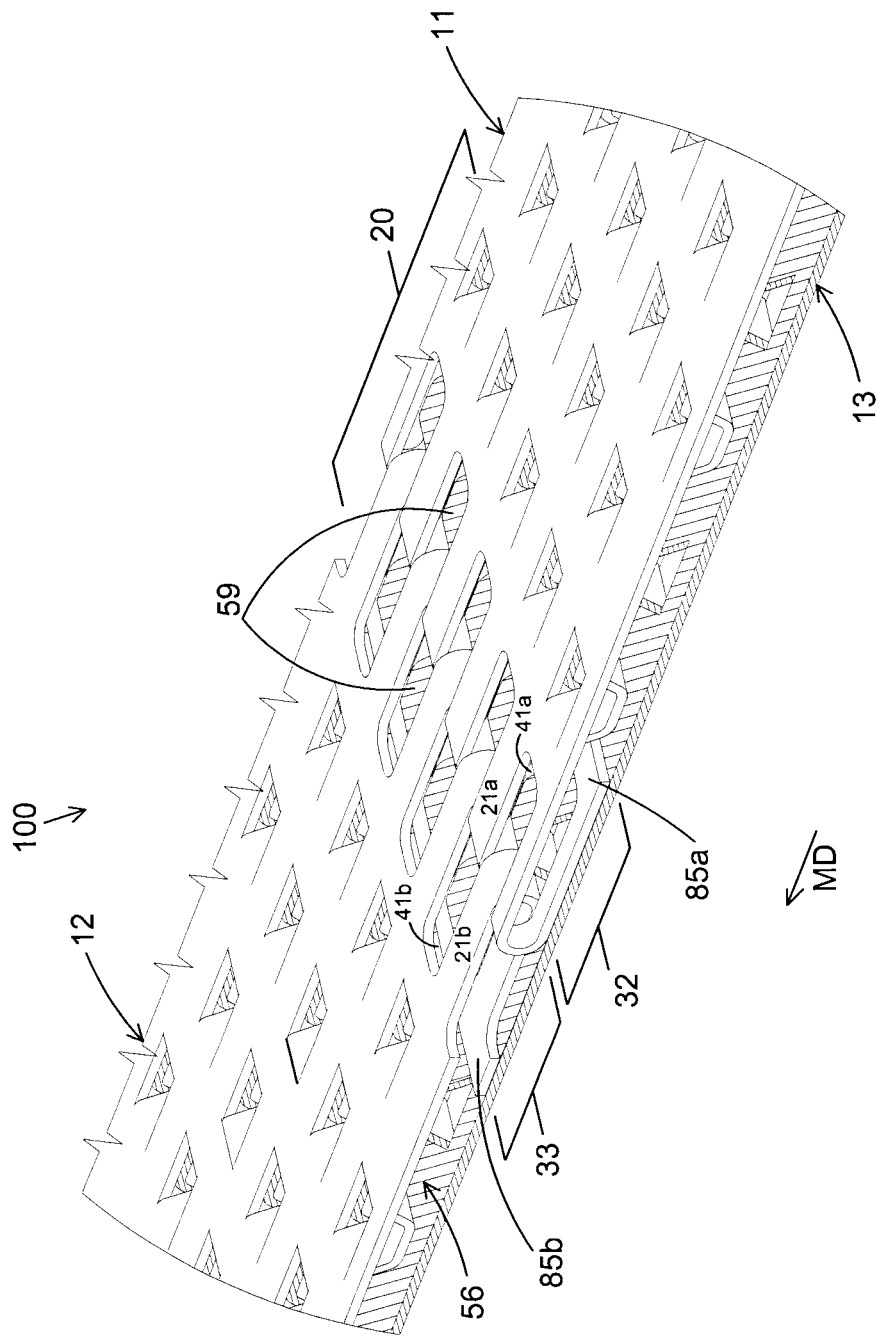
FIG. 5A is an enlarged view of the circled area 5A in FIG. 4.

FIG. 5A is an enlarged view of the circled area 5A & 5B in FIG. 4. FIG. 5A shows seam region (20) of textile (100) in greater detail. Folded panels (11) and (12) are interconnected at seam region (20) by simultaneous insertion of seam loops (21a) of folded panel (11) into loop-receiving openings (41b) of folded panel (12), and seam loops (21b) of folded panel (12) into loop-receiving openings (41a) of folded panel (11). A central portion of the body region of folded panel (13) is located beneath seam region (20), and in contact with fold regions (32) and (33). Furthermore, edge regions (85a) (of panel (11)) and (85b) (of panel (12)) are each dimensioned to fit into land channels (56) between the columns of protrusions (59) of folded panel (13).

Protrusions (59) are located in a portion of loop receiving openings (41a, 41b) and serve to maintain continuity of the properties of the outer surfaces of the folded panels in the fold regions (32, 33). This is shown in greater detail in FIGS. 7A and 7B. Edge region (85a) can be secured to the planar inner surface of land channel (56), as indicated by (70a) in FIG. 8. The securement may be carried out by methods such as laser welding, ultrasonic welding or other processes known in the art, depending on the material of the panel. Similarly, edge region (85b) of folded panel (12) is secured to an inner surface of land channel (56) in panel (13) at (70b), as shown in FIG. 8. A connecting member (81) can be inserted through the resulting open seam channel (80) (see FIG. 8) to further reinforce the resulting seam strength and to prevent or resist compression of the seam region (20).

Figure 5B:
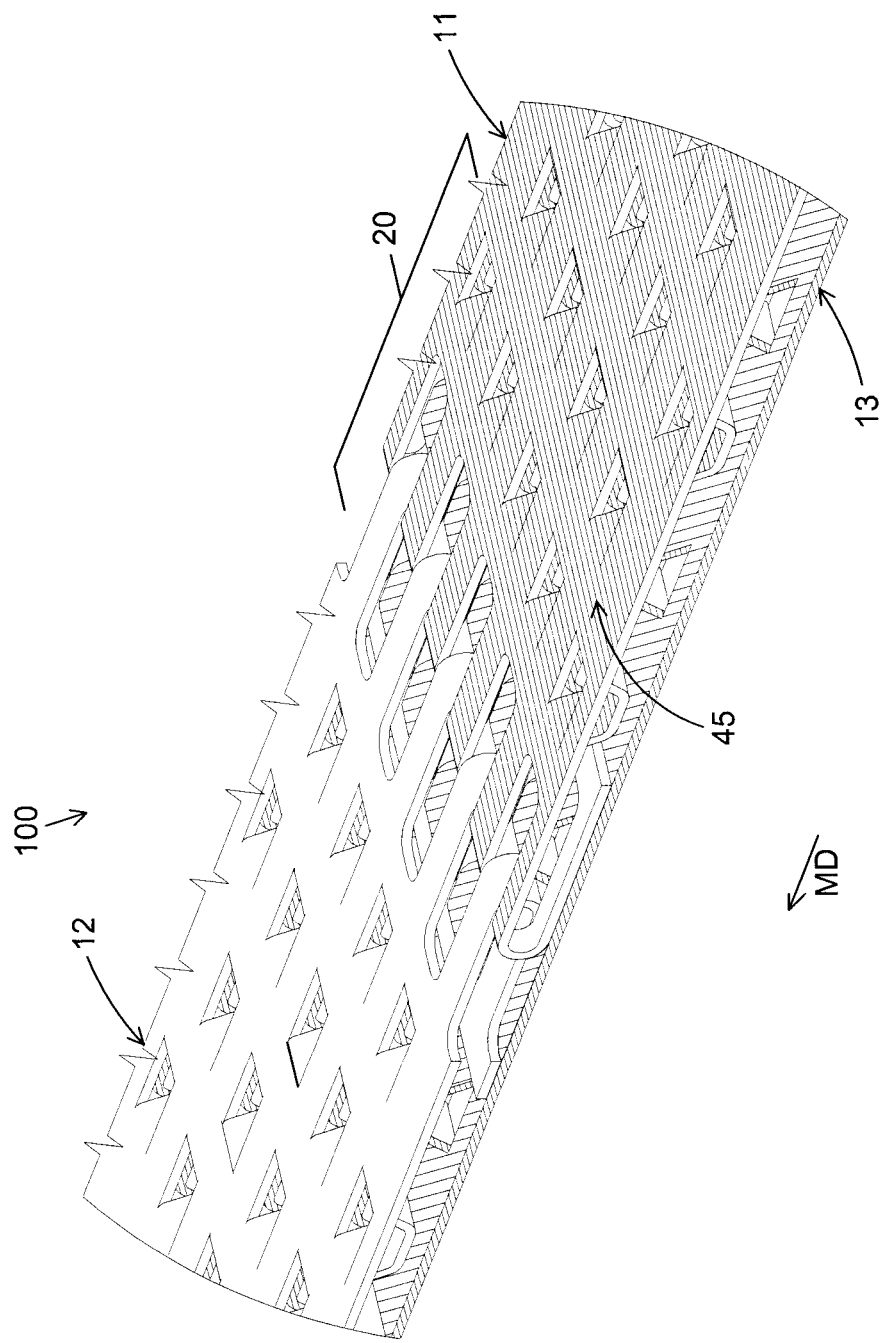
FIG. 5B is similar to FIG. 5A, illustrating surface roughness on an outer surface of a folded panel.

The outer surface of the folded panels can have roughness thereon. An example of surface roughness is shown in FIG. 5B, where the outer surface of folded panel (11) includes striations (45).

Figure 6:
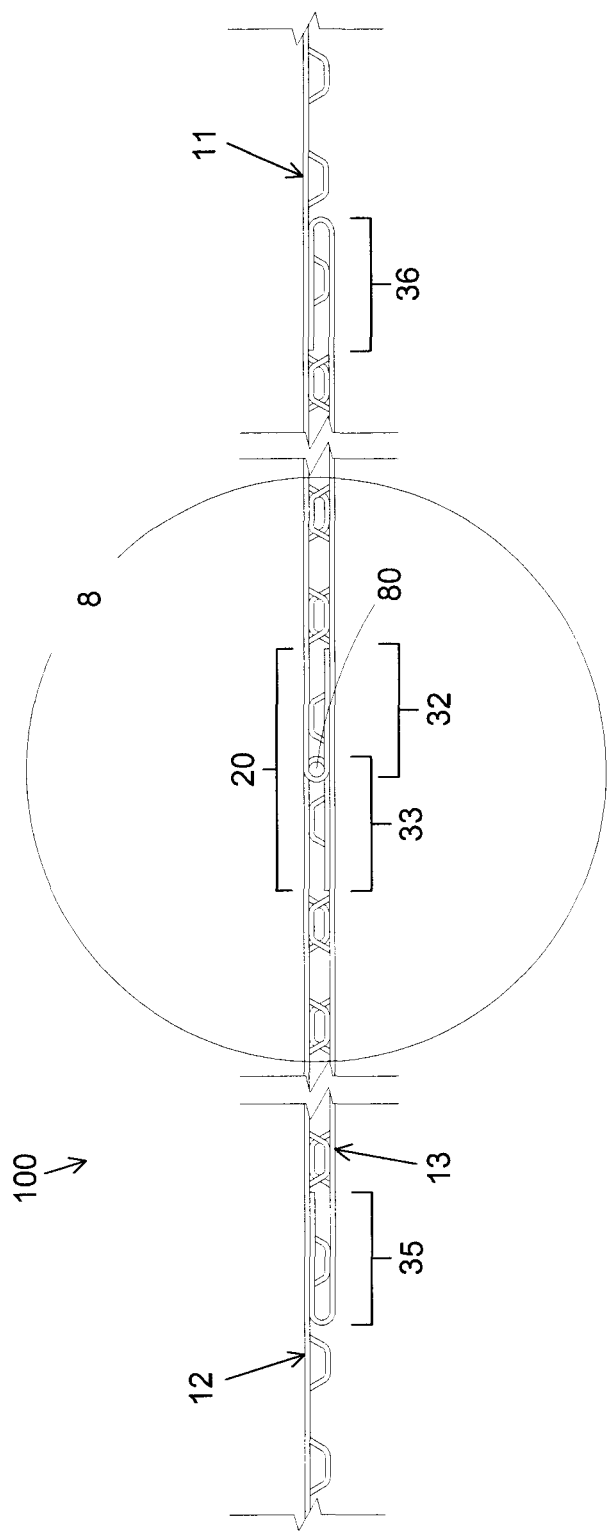
FIG. 6 is a side sectional view of the non-woven double-layer industrial textile shown in FIG. 5A.

FIG. 6 is a side sectional view of the textile (100) shown in FIGS. 4 and 5A. Folded panels (11) and (12) are interconnected at seam region (20) by interconnecting their seam loops in the manner described above, resulting in seam channel (80). The inner surface of the central portion of the body region of folded panel (13) is located below and in contact with the inner surfaces of folded panels (11) and (12) such that protrusions (59) are aligned with protrusions (57) and (58) of folded panels (11) and (12) respectively, so as to form arrays of engaged protrusions as previously described.

Figure 7:
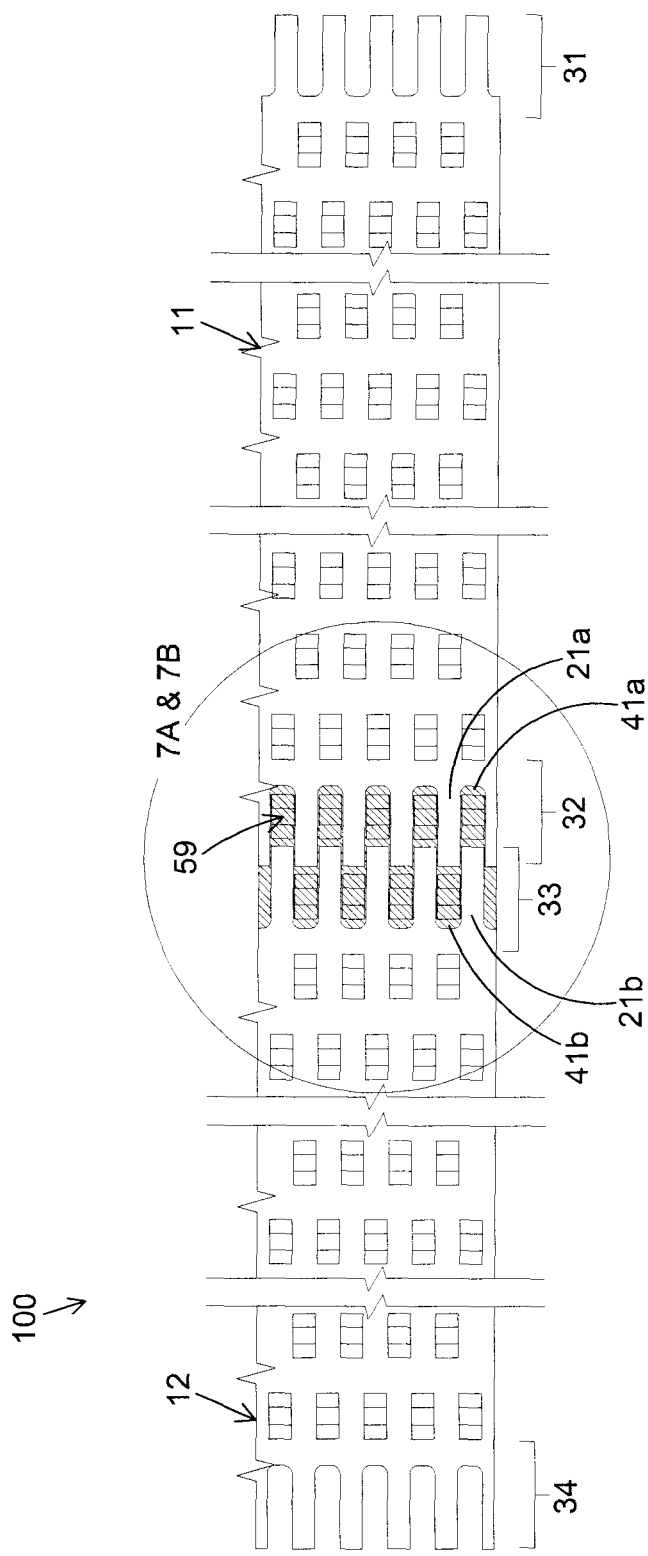
FIG. 7 is a top view of the assembled folded panels shown in FIG. 4.
Figure 7A:
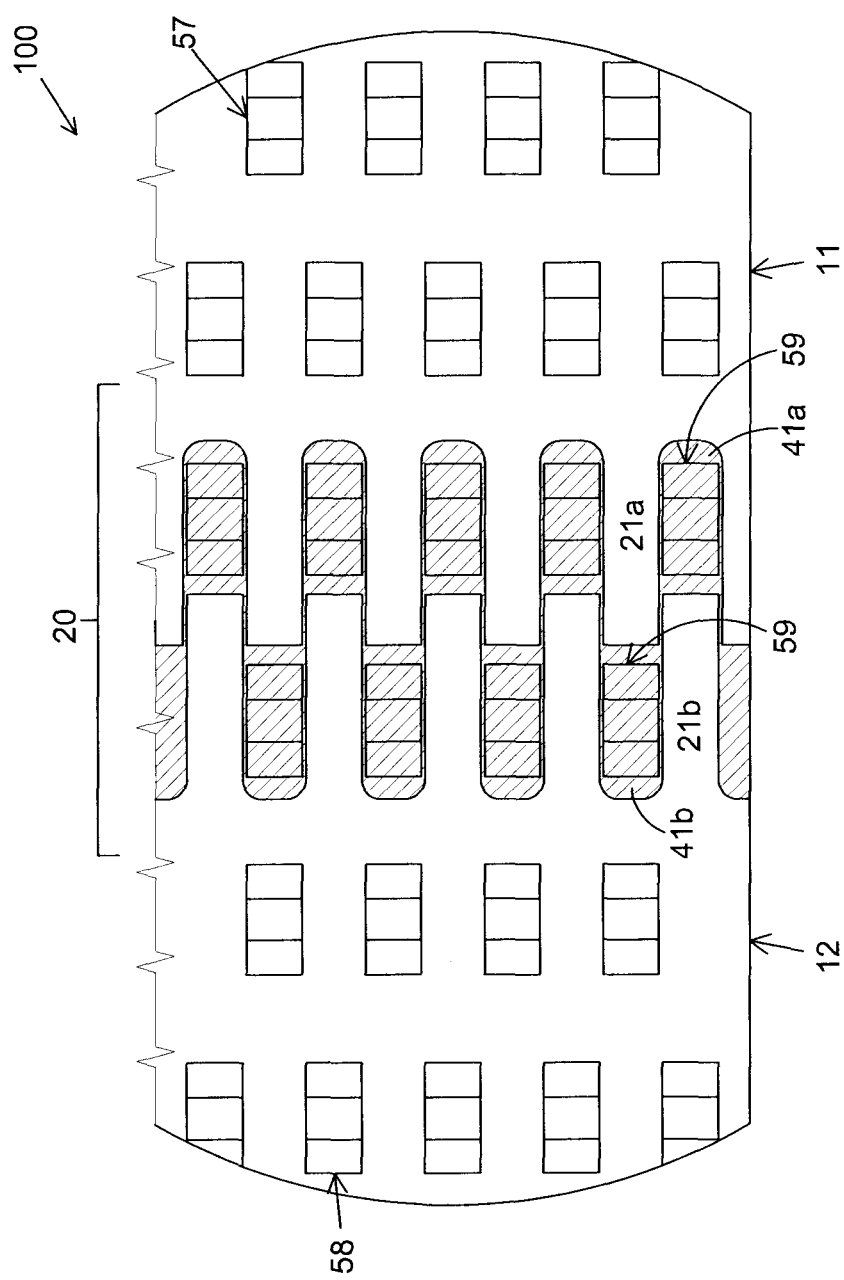
FIG. 7A is an enlarged view of the circled area 7A & 7B shown in FIG. 7.
Figure 8:
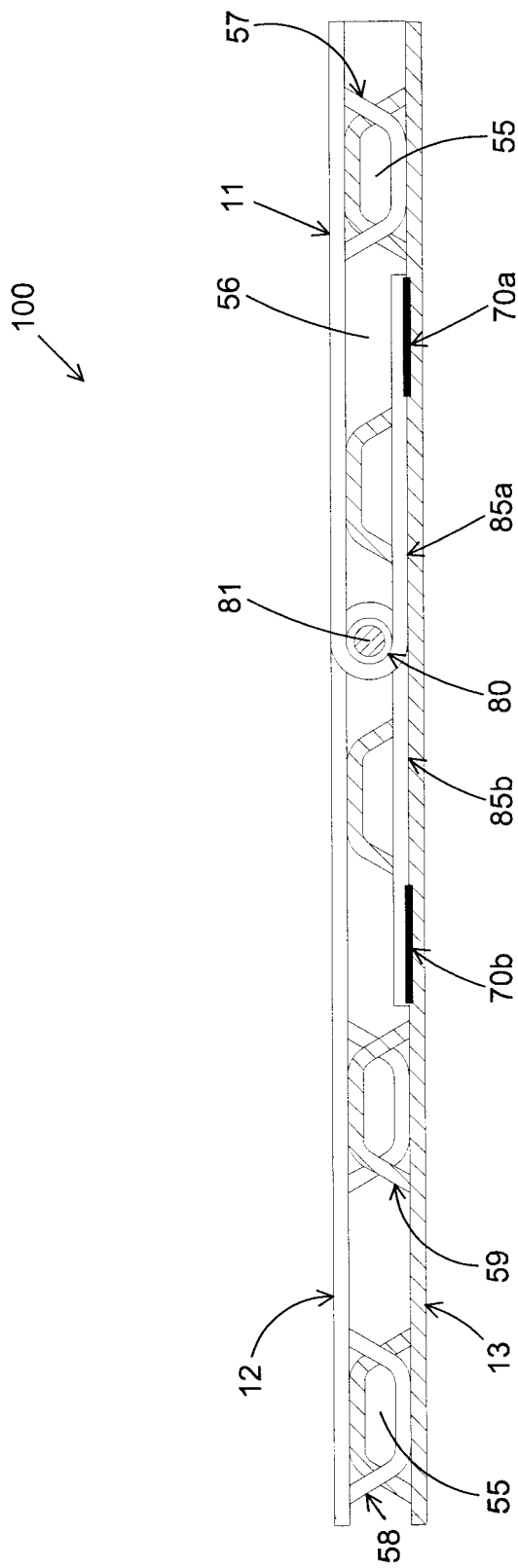
FIG. 8 is an enlarged view of the circled area 8 of FIG. 6.

FIG. 7 is a top view of the assembled folded panels shown in FIG. 4, while FIG. 7A is an enlarged view of the encircled area 7A & 7B in FIG. 7.

With reference to FIGS. 7 and 7A, folded panel (13) lies beneath folded panels (11) and (12) and is obscured in these views, except for protrusions (59). The seam loops (21b) of folded panel (12) are inserted into seam loop receiving openings (41a) of folded panel (11), while the seam loops (21a) of folded panel (11) are inserted into the seam loop receiving (41b) openings of folded panel (12). Protrusions (59) of folded panel (13) emerge from below into a portion of loop-receiving openings (41a) and (41b). Protrusions (59) are dimensioned in combination with the seam loops (21a) and (21b) to minimize any surface discontinuity at the seam region (20). The positioning of protrusions (59) results in a generally continuous pattern of protrusions across seam region 20. In addition, once inserted into loop receiving openings (41a, 41b), surfaces (51) of protrusions (59) are substantially coplanar with the outer surface of each of folded panels (11) and (12).

Figure 7B:
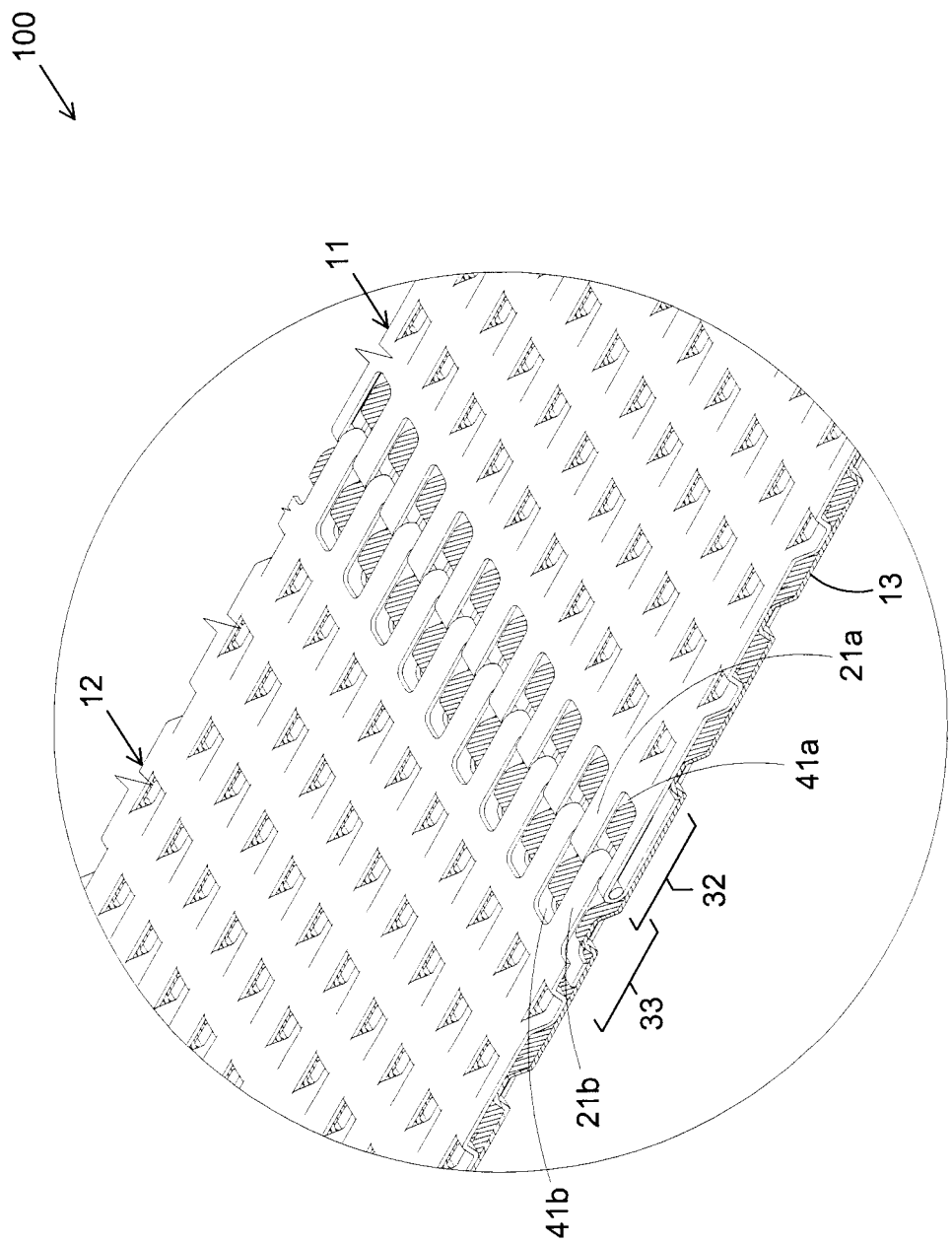
FIG. 7B is an enlarged perspective view of the circled area 7A & 7B shown in FIG. 7.

FIG. 7B presents a perspective view of the encircled area 7A & 7B of FIG. 7. Protrusions (59) are located in open regions of seam loop receiving openings (41a) and (41b). Positioning of the protrusions (59) at the seam region (20) serves to minimize discontinuity of fabric properties at this location as the top surfaces (51) of the protrusions (59) allow for near coplanar support with the exterior product supporting outer surfaces of folded panels (11) and (12). The difference in height of the protrusion top surface (51) and the outer surface of the textile (100) will be equal to the thickness of the material used to make the folded panel, while providing sufficient open area in the seam loop receiving openings (41a, 41b) to allow movement of fluid and/or air through the seam region (20).

FIG. 8 is an enlarged view of the circled area 8 of FIG. 6, showing an arrangement of seam loops of fold regions (32) and (33) in seam region (20). Seam loops of folded panel (11) interconnect with seam loops of folded panel (12), thereby forming a seam channel (80) into which a connecting member (81) may optionally be inserted to interconnect folded panels (11) and (12). Examples of a connecting member include a joining pin, a pintle or other filamentary material. The protrusions (57) of folded panel (11) align with the protrusions (59) of folded panel (13), such that the apertures (55) of each protrusion (57, 59) are in alignment. A similar arrangement exists for the protrusions (58, 59) of folded panels (12, 13) respectively.

As discussed above, dimensions of the seam loops and attached edge regions (85a) and (85b) are selected such that each edge region (85a, 85b) fits into land channel (56) on the opposite folded panel (13) where it may be secured. The dimensions of the seam loops, the seam loop receiving openings, protrusions and the land channels are identical in all of the folded panels, thus allowing the seam loops and edge regions (85a, 85b) to interconnect in the manner shown. The seam region (20) may be secured by a number of methods as discussed below. As shown in FIG. 8 a portion of the edge region (85a) of folded panel (11) can be secured at (70a) to the planar surface of a land channel (56) in folded panel (13). Similarly, edge region (85b) of folded panel (12) can be secured to an inner surface of land channel (56) in panel (13) at (70b).

Figure 9A:
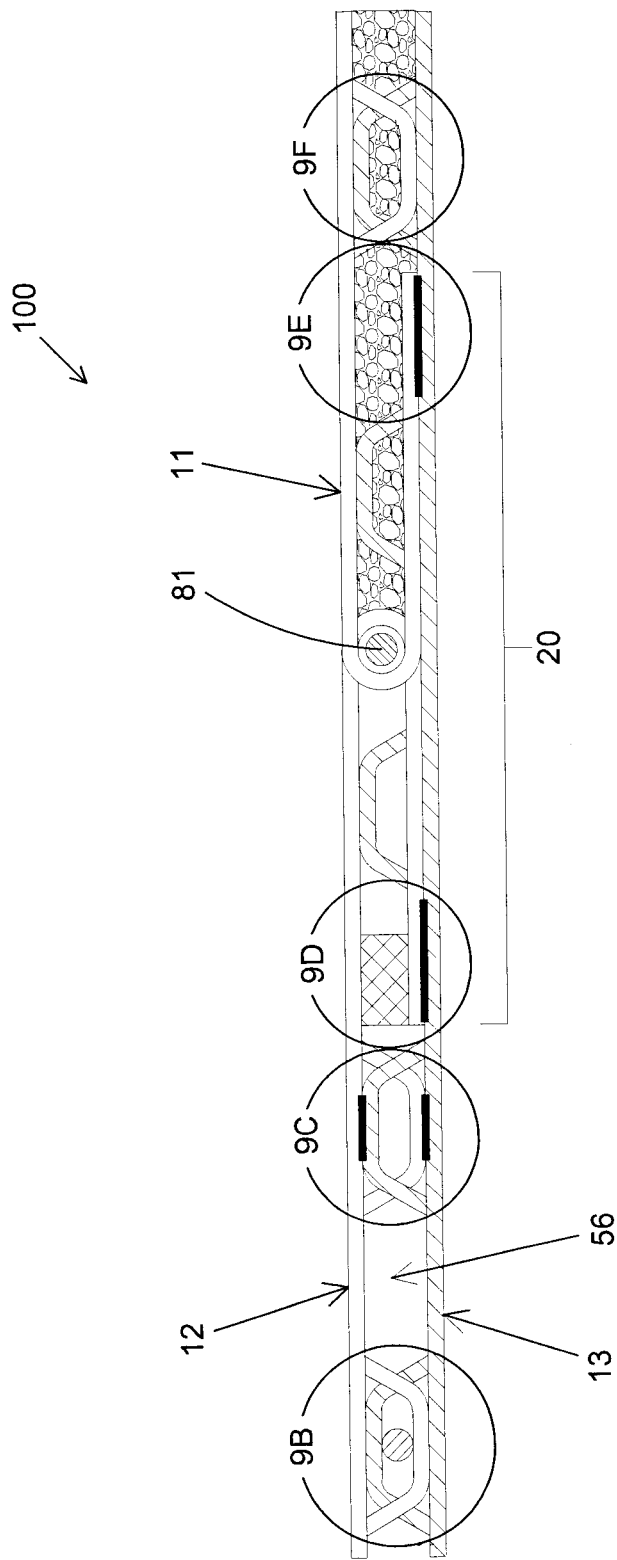
FIG. 9A is a similar view to that of FIG. 8, illustrating different materials and interconnection options between the panels.

FIG. 9A provides a view similar to that of FIG. 8 and illustrates a number of methods to further secure the upper (11, 12) and lower (13) folded panels to each other, at each of circled regions 9B, 9C, 9D, 9E and 9F. One or more of these features may be incorporated into the assembled industrial textile. Each feature is discussed below with reference to FIGS. 9B through 9F.

Figures 9B, 9C:
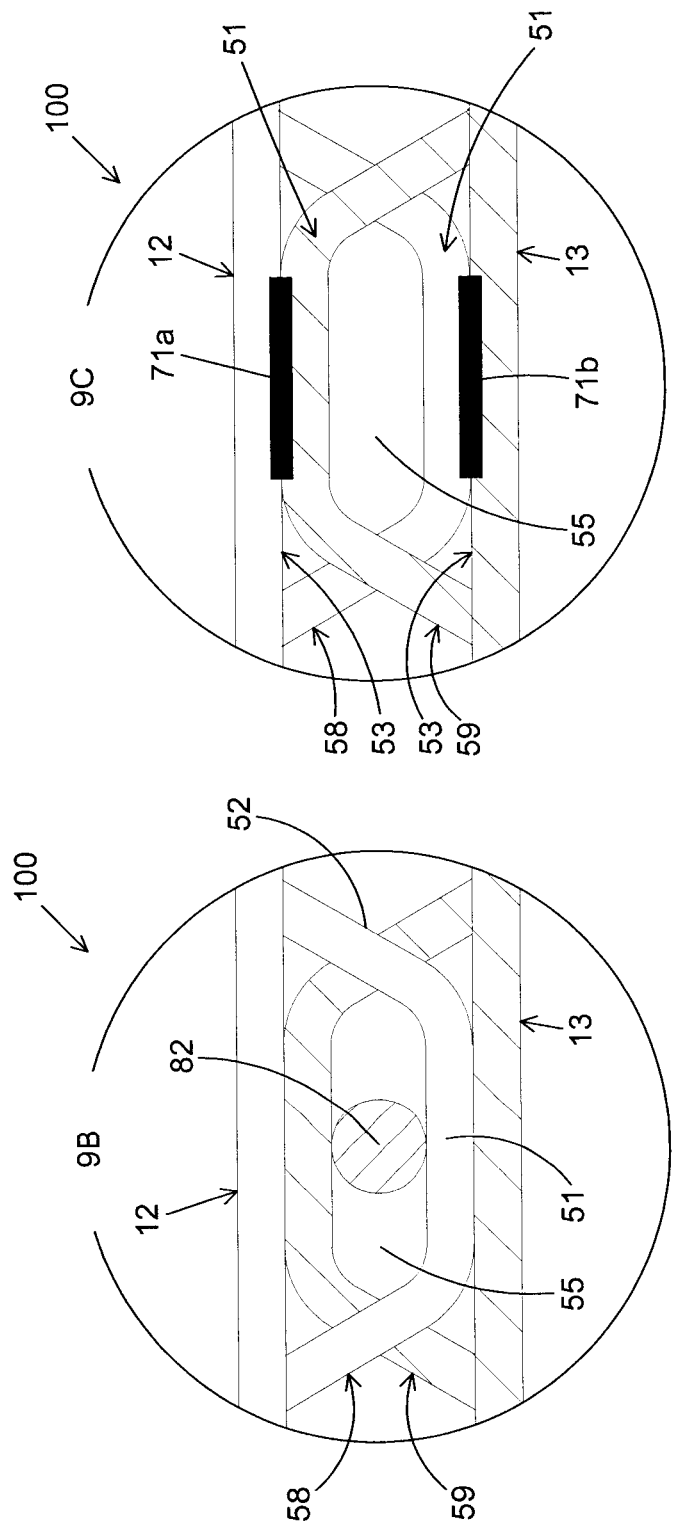
FIG. 9B is an enlarged view of the circled area 9B of FIG. 9A showing insertion of a filamentary element into the aligned protrusion apertures of an upper and lower folded panel.
FIG. 9C is an enlarged view of the circled area 9C of FIG. 9A showing the location of bonds between upper and lower folded panels.

FIG. 9B illustrates the use of a filamentary element (82), such as a monofilament or yarn inserted through the aligned lateral apertures (55) of protrusions (58) and (59) across the breadth of the interconnected panels (12) and (13). The filamentary element (82) mechanically interlocks the upper and lower panels through their aligned apertures (55) so as to prevent separation. This interconnection process may be repeated across the length and width of the assembled textile (100) at selected locations in order to enhance panel interconnection along the desired length of the textile (100). Such a securement method can be used in place of, or in addition to, bonding configurations at (71a) and (71b) illustrated in FIG. 9C.

FIG. 9C illustrates another method of securing upper (11, 12) and lower (13) folded panels in the formation of textile (100). Surface (51) of protrusion (58) from upper folded panel (12) may be secured to the opposing land area (53) at (71b). Similarly surface (51) of protrusion (59) from lower folded panel (13) may be secured to the opposing land area (53) at (71a). It is possible to secure a protrusion to an opposing planar surface at either (71a), (71b), or both. This may be done for each protrusion in the textile (100), or for a few protrusions. As an example, it is possible to secure every second, third or other number of protrusions in this manner. Alternatively, it is also possible to secure every second, third or other number of columns of protrusions to the opposing planar surfaces.

Securement may be achieved by a number of methods, including use of chemical bonding, adhesives and welding. Where the panels comprise thermoplastic and radiant-energy absorbent material, through transmission laser welding (TTLW) can be used to bond a protrusion surface (51) to an opposing land area (53), thereby interconnecting opposing panel layers of the textile or securing the seam regions.

Figure 9E:
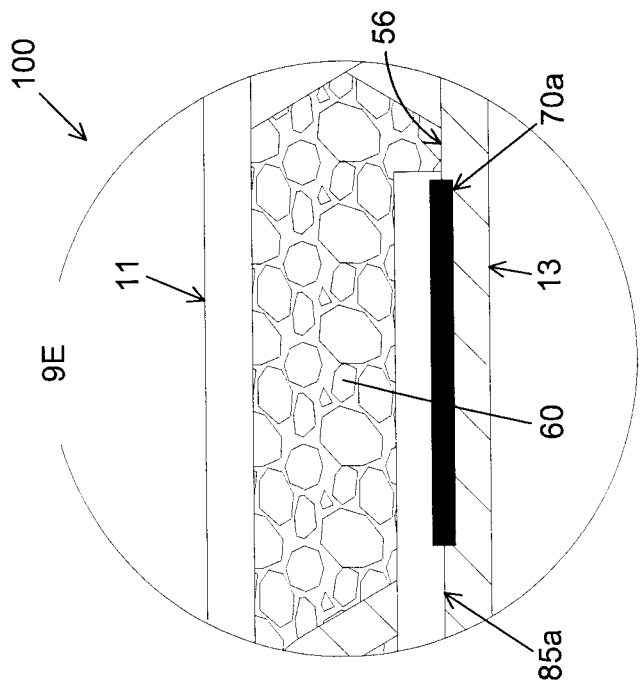
FIG. 9E is an enlarged view of the circled area 9E of FIG. 9A showing addition of open cell porous foam into regions between the two folded panels.
Figure 9D:
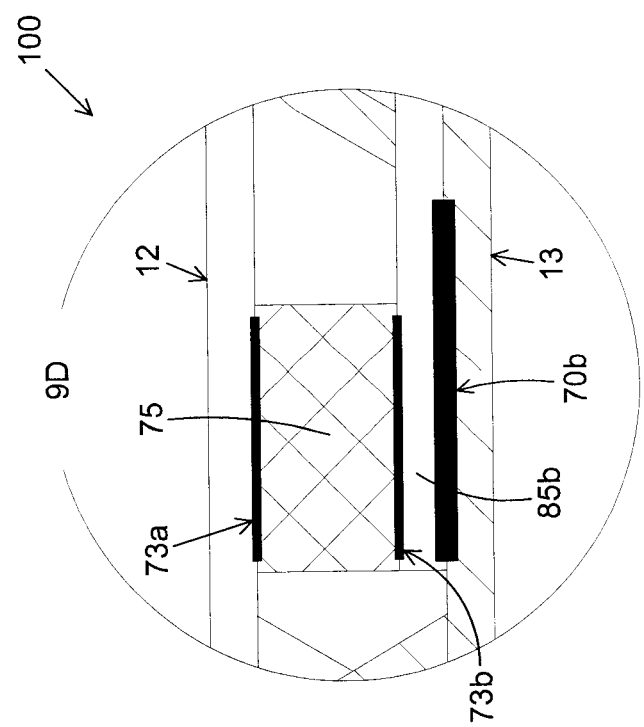
FIG. 9D is an enlarged view of the circled area 9D of FIG. 9A showing the location of a spacer member bonded at a seam region of a folded panel.

FIG. 9D illustrates the use of a spacer member (75) to which an edge region (85b) can be bonded. Spacer member (75) is placed between panel surfaces at an edge region (85b) and can be bonded at contact points (73a, 73b). One or more spacer members can be used at selected edge regions across the breadth of the textile in the MD direction, and may be either continuous or discontinuous across the breadth of the panel in the CD direction.

Spacer member (75) can be formed from any suitable material, such as a material similar to, or substantially the same as that used to prepare the folded panels. The spacer member may further comprise a laser weld enabling material, such as a polymeric monofilament, film or the like, which includes a radiant energy absorber. The spacer member can have a height that maintains continuity in the planar surface of the folded panels. In addition, the width of the spacer member is less than or equal to the width of land channel (56). In addition, the spacer member may be bonded, for example, by laser welding, at contact points (73a) and (73b).

Use of a spacer member allows for the production of folded panels such as 11, 12, 13 ahead of final assembly into a complete textile, without having to bond each edge region (85a, 85b) to the opposite panel in the manner previously described. Adjacent folded panels that include spacer member (75) can then be interconnected to one another by inserting a connecting member (81) into the seam channel (80) formed by interconnection of the seam loops of the adjacent panels (see FIG. 6, for example).

Figure 9F:
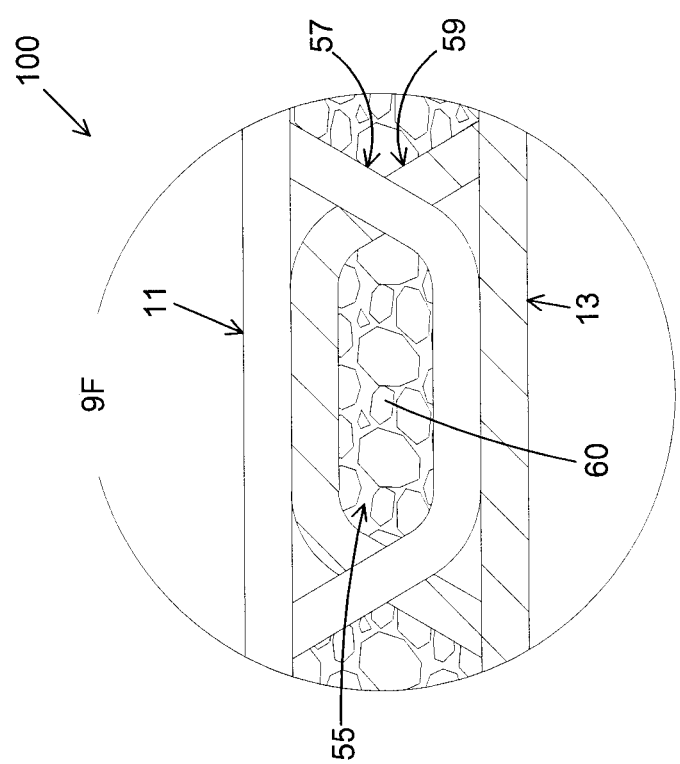
FIG. 9F is an enlarged view of the circled area 9F of FIG. 9A showing addition of an open cell porous foam into spaces between aligned protrusions of folded upper and lower panels.

FIG. 9E illustrates a portion of the edge region (85a) of folded panel (11) secured at (70a) to the planar surface of a land channel (56) in folded panel (13). As mentioned above, the bond may be formed by TTLW or other suitable means. FIG. 9E also shows addition of a foam (60) such as a closed cell foam or a porous open cell foam into an interior region between the folded panels at (11) and (13) in seam region (20). The foam (60) may be optionally injected into either the land channels (56), apertures (55) (as shown in FIG. 9F), or into the interior surfaces of each folded panel (or any combination thereof) prior to assembly of the textile. The porous nature of open cell foam allows for the passage of fluids, while either (an open or closed cell foam) ensures both strong securement between the opposing folded panels, and resistance to compressive forces that may be applied to the textile when in use. A wide variety of open and closed cell foams are available; selection of an appropriate foam is determined by the intended end use of the panel and textile.

FIG. 9F illustrates the optional insertion of a foam (60), such as a closed cell foam or a porous open cell foam, injected into either the apertures (55) or land channels 56 outside the seam region (20). The porous nature of an open cell foam allows for the passage of fluids through the apertures (55) of the textile (100), while either an open or closed cell foam ensures both a strong bond between the opposing folded panels, and resistance to compressive forces that may be applied to the textile when in use.

It should be noted that the material used to make the panels will determine the types of methods used to attach panels to each other. In general, a panel comprises a thermoset polymer, a thermoplastic polymer or a metal. When a thermoset polymer is used, generally mechanical and/or adhesion methods can be used to interconnect the panel layers. Mechanical methods include, but are not limited to, fasteners, inserts, sewing, snap-fits, swaging, staking, and so on. When a thermoplastic polymer is used, mechanical methods, adhesion, welding, and a combination thereof can be used. Examples of welding methods include, but are not limited to, laser, hot gas, induction/electromagnetic, ultrasonic and vibrational welding. One particular welding method that can be used is through transmission laser welding. Metals are similar to thermoplastic polymers, with the exception that sewing/stitching methods cannot be used. Such considerations apply to all embodiments of the textile.

Figure 10:
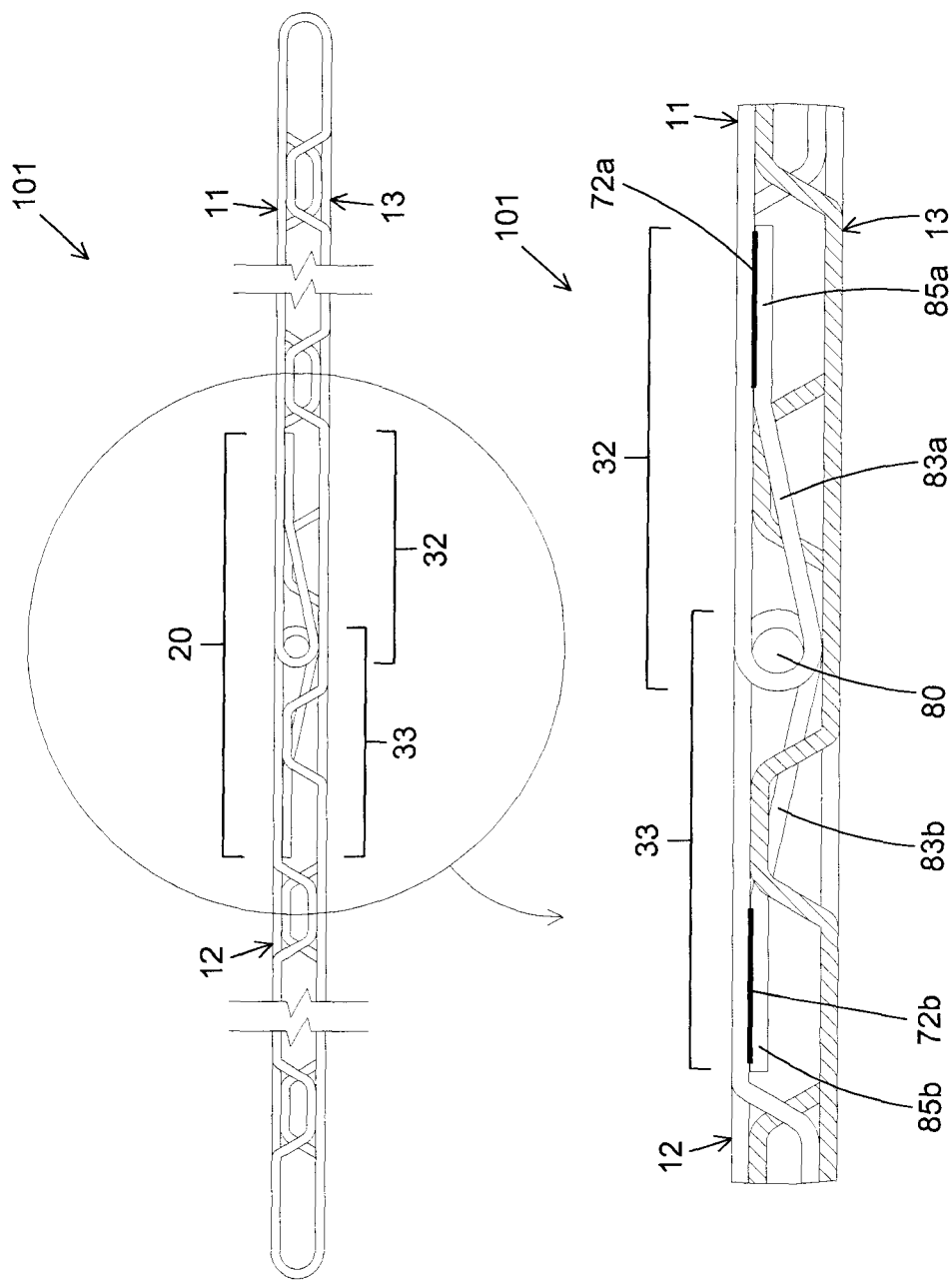
FIG. 10 is a side sectional view of a double layer non-woven industrial textile showing an alternate configuration of the end regions of each folded panel.

FIG. 10 illustrates an alternate arrangement of securing edge regions (85a, 85b) of the folded panels (11) and (12). Textile (101) comprises three folded panels (11), (12) and (13) arranged in the manner previously discussed. However, instead of being secured to opposing folded panel (13), edge regions (85a, 85b) are secured at regions (72a) and (72b) to the inner surfaces of folded panels (11) and (12), respectively. That is, each fold region (32, 33) is no longer folded in a "U" shape (as in FIGS. 2 to 9), but rather, as a "rope hem" configuration. A portion (83a, 83b) of each fold region (32, 33) is brought around seam channel (80) such that an inner surface of the portion (83a, 83b) is directed towards the inner surface of the corresponding folded panel (11, 12). Each edge region (85a, 85b) is in contact with the inner surface of the corresponding folded panel (11, 12) at a planar interior surface of land channel (56), where it is secured at (72a, 72b) in a manner described above. Folded panel (11)

is connected to folded panel (12) by interconnecting seam loops at fold regions (32) and (33) as described above. Folded panel (13) is positioned such that a central portion lies beneath the seam region (20). In addition, folded panel (13) is joined to adjacent folded panels (not shown) in a manner similar to that of interconnecting folded panels (11) and (12).

The embodiment presented in FIG. 10 simplifies the construction and assembly of the folded panels since securement of edge regions (85a, 85b) can be made ahead of the multi-panel assembly. In the embodiment presented in FIGS. 2 to 9, edge regions (85a, 85b) of folded panels (11) and (12) form a U-shape (or open hem) and are subsequently secured to the planer surface of land channel (56) of folded panel (13). In the embodiment shown in FIG. 10, however, since each edge region (85a, 85b) is secured to its own folded panel (rather than to an opposite folded panel), the folded panels can be made ahead of assembly as securement of the edge region to a folded panel in an opposite layer is no longer necessary. Furthermore, the number of securing regions required in the seam regions of this embodiment is fewer than that required when using spacer member (75) shown in FIG. 9D. When a rope hem is used, securement of the upper layer of folded panels to the lower layer of folded panels can be achieved via a combination of the methods illustrated in FIGS. 9B, 9C, 9F, and part of FIG. 9E, in which only insertion of the porous foam (60) can be used.

It will also be appreciated that in the embodiments illustrated in FIGS. 2 to 10, all free ends (such as the outside edges 29a, 29b in FIG. 1A) of each folded panel in the assembled textile are within the interior of the textile. That is, none of the outside edges are directly exposed beyond the outer surfaces of the textile.

Method of Assembly

Assembly of a textile (100) is described with reference to FIGS. 4 through 10.

In one method of assembly, seam loops (21a) of folded panel (11) are inserted into the loop-receiving openings (41b) of folded panel (12). Simultaneously, seam loops (21b) of folded panel (12) are inserted into the loop-receiving openings (41a) of folded panel (11). This results in the formation of seam channel (80) between the two folded panels (11, 12) (see FIGS. 4-6). A connecting member (81) is then inserted into seam channel (80) to secure folded panels (11) and (12) together at seam region (20) (see FIG. 9). A third folded panel (13) is then brought below the secured folded panels (11, 12) such that the inner surfaces of all three panels face each other (see FIG. 4). Furthermore, seam region (20) lies above approximately midway the central body portion of folded panel (13) (see FIG. 4). In addition, columns of protrusions in panels (11, 12) are aligned with columns of protrusions of panel (13); however, the protrusions are staggered such the surface of protrusions in one layer fit into a land area between protrusions in the other layer, as shown in FIGS. 4 and 5A. Furthermore, as shown in FIGS. 6 and 7, slots (41a, 41b) receive protrusions (59) from below.

The upper layer of folded panels (11, 12) is then secured to the lower layer of folded panel (13) as follows. A plurality of flat surfaces of the protrusions is secured to the corresponding opposite land areas proximate either side of the seam region (20). That is, surface of protrusions (59) can be secured to opposite land areas (53) and/or surface of protrusions (57, 58) can be secured to opposite land areas (53) (see for example, FIG. 9C). Bonding, welding and other methods known in the art can be used to secure protrusion surfaces to opposite land areas.

The lower layer of the textile is further constructed by placing another folded panel (not shown) adjacent folded panel (13) at fold region (36), and inserting seam loops of the adjacent folded panel into seam loop receiving openings of folded panel (13), to create a seam region such as (20) that includes a land channel similar to seam channel (80) (see FIGS. 4 to 6). A connecting member (81) is then placed into the seam channel (80) to secure folded panel (13) with folded panel (14), similar to the way in which folded panels (11) and (12) are secured together. This new seam region (20) in the lower layer, mirrors the seam region (20) in the upper layer, and secured folded panels (13) and the adjacent folded panel are secured to folded panel (11) in a manner similar to the way folded panels (11, 12) are secured to folded panel (13). The lower layer can be further constructed by adding another folded panel at fold region (35) of folded panel (13) and repeating the above steps.

This method can be used whether a U-shaped hem (see FIG. 5A) or a rope hem (see FIG. 10) is used in the fold region of each panel. Additional methods of securing the upper and lower layers, as illustrated in FIGS. 9-9F, may also be used.

The above steps are repeated in both the upper and lower layers until a desired length of the textile is achieved.

In an alternate method of assembly, connecting member (81) is not required for securing adjacent folded panels within the same layer of the textile. First, fold region (32) of folded panel (11) is placed above approximately the midway point of the central body region of folded panel (13) (see FIG. 5A). Slots (41a) receive protrusions (59) of folded panel (13) from below (see FIG. 7A), while other columns of protrusions of folded panels (11) and (13) align as shown in FIG. 5A. Edge region (85a) of folded panel (11) is secured to the inner surface of folded panel (13) (see FIG. 5A), using methods known in the art, such as bonding, welding, and the like. The edge region in fold region (36) of folded panel (13) is secured to the inner surface of folded panel (11), in a similar manner.

Once folded panels (11) and (13) are secured to each other, folded panel (12) is brought into alignment adjacent folded panel (11), such that seam loops are inserted into seam-loop receiving openings in both folded panels (11, 12). Slots (41b) receive protrusions (59) from below (see FIG. 8A), while other columns of protrusions of folded panels (12) and (13) align as shown in FIG. 5A. Edge region (85b) of folded panel (12) is then secured to the inner surface of folded panel (13) (see FIG. 5A). With the upper and lower layer secured to each other via edge regions (85a, 85b) of the upper layer, a portion of the protrusions can be secured to the opposing land areas, in a manner as described above.

The lower layer of the textile can be further constructed by placing an additional folded panel (not shown) adjacent folded panel (13) at fold region (36), and intermeshing the seam loops and seam receiving openings (see FIG. 4). The edge region of the additional panel, adjacent folded panel (13), can then be secured to upper folded panel (11) as described above. The same type of construction can be made at fold region (35) of folded panel (13) (see FIG. 4).

These steps can be repeated in the upper and lower layers until a desired length of the textile is achieved. Additional methods of securing the upper and lower layers, as illustrated in FIGS. 9-9F, may also be used.

It should be noted that the second method cannot be used when a rope hem (see FIG. 10) is used in the fold region of each panel, as each edge region cannot be bonded to an opposite panel. When a rope hem is used, adjacent folded panels (11, 12) must be secured together with a connecting member (81)

In either method, a computer-aided manufacturing process can be optimized to make precision securements between the layers.

Panel Material

Panels used in the construction of a double-layer nonwoven industrial textile can include a thermoplastic polymer material, such as (but not exclusively) polyesters and polyamides. Alternatively, the panel can include a thermoset polymer, such as (but not exclusively) polyimides. Or, a formable metal may also be used in the construction of a panel. Where the panel is comprised of thermoplastics, laser welding can be used to secure panel surfaces to each other. Other bonding methods, such as chemical adhesives and mechanical attachments, can also be used.

The panels can be formed from a film that comprises a medium to high intrinsic viscosity (IV) polyester selected from the group consisting of polyethylene terephthalate (PET), polybutylene terephthalate (PBT), polyethylene naphthalate (PEN), and poly(cyclohexylene dimethylene terephthalate) acid (PCTA). It should be noted that other medium to high IV polyesters can be used. Polyamides including polyamide-6 (PA-6), PA-6/6, PA-6/10, PA-6/12 and other such materials can also be used. Polyolefins including polyethylene and polypropylene can also be used.

In instances where heat-resistant or wear-resistant material is required, the panels can be made of polyphenylene sulphide (PPS), polyaryl ether ketones (PAEK) such as polyether ether ketones (PEEK), poly(cyclohexylene dimethylene terephthalate) acid (PCTA) or a hydrolysis-stabilized thermoplastic material.

A film of polyester, in particular polyethylene terephthalate (PET), and having an IV that is between about 0.5 and 1.0 can be used. The film may be coextruded in two or more layers, or otherwise may consist of multiple layers. At least one layer of the PET film may also be bi-axially oriented and hydrolytically stabilized to prevent premature depolymerization due to hydrolytic degradation when the film structure is intended for use in hot and moist environments. In such applications, carbodiimides can be used. Examples of such films are disclosed in WO 2013/177670 (incorporated herein by reference) in which the film is oriented in both the longitudinal and transverse directions to maximize its elastic modulus and other physical properties, such as tensile strength and free shrinkage.

As an example, the film, or at least one layer of a multilayer film, comprises a hydrolytic stabilizer comprising a carbodiimide. In such an example, for each layer comprising a hydrolytic stabilizer, the carbodiimide comprises between 0.5% parts by weight (pbw) and 5% pbw of the material of that layer. The carbodiimide can be selected from a monomeric form and a polymeric form. In particular the carbodiimide can be polymeric.

The polymer film material used in the panel structures can also include a laser-weld enabling material; at least one film layer can comprise a radiant energy absorbent material such as carbon black. Such a polymeric film material is disclosed in WO 2013/071419.

The film material can comprise at least two coextruded miscible layers in which at least one outer layer includes a radiant energy absorbent material and is about from 5% to 20% of the overall film thickness or caliper, which may be from about 100 μm up to 500 μm. The overall film thickness can also be in the range of about 250 μm to 350 μm.

Furthermore, there can be and three coextruded miscible layers in such a film.

When the film material comprises two layers, a first layer can include a radiant energy absorbent material and can comprise from 5% to 15% of the overall film thickness, while the second layer can comprise from 85% to 95% of the overall film thickness. In addition, the first layer can comprises about 10% of the film thickness and the second layer can comprise about 90% of the film thickness.

Where the film comprises three layers, each outer layer can comprise from 5% to 20% of the overall film thickness and an inner layer can comprise from 60% to 90% of the total film thickness. In addition, each outer layer can comprise from 10% to 15% of the film thickness and the inner layer can comprise from 70% to 80% of the film thickness. At least one of the two outer layers can comprise a radiant energy absorbent material. In these examples, for each layer comprising a radiant energy absorbing material, the absorbent can be carbon black which is incorporated so as to comprise from about 0.1% to about 1% w/w of the polymer material in the film layer.

Other radiant energy absorbing materials, such as clear or dyeable products e.g. Clearweld® (available from Gentex Corporation of Carbondale, Pa.) or Lumogen® (available from Basf Corporation) may also be used. The amounts of the additive used, will depend on the additive selected, but where the additive is carbon black, it can be present in amounts ranging from about 0.1% pbw to about 1.0% w/w based on the total weight of the at least one outer film layer. The amount of laser energy absorbent material additive incorporated into the film layer depends on the final thickness of the layer, taking into account the wavelength of the laser intended to be used in the welding process.

Optionally, at least one layer of the multilayer film can further comprise an additive, such as at least one of titanium dioxide, or at least one dye.

For some uses, the panel may be constructed of a thermoset polymer material such as a commercially available linear or aromatic heterocyclic polyimides which are sold in the marketplace under the tradenames Apical™, Kapton™, UPILEX™, VTEC PI™, Norton TH™ and Kaptrex™; others may be suitable. Thermosets are not amenable to laser welding and can be bonded using one of an epoxy, a solvent or chemical adhesive such as a hot melt adhesive.

A formable metal material may also be employed and, in particular, a formable metal material selected from at least one of aluminum alloy, brass, cold rolled steel, copper, galvanized steel, high strength low alloy steel, hot rolled steel, steel alloys, stainless steel and zinc. As used herein, the phrase "formable metal material" refers to a metal that that can undergo strain beyond the elastic limit of the material without causing excessive strain localization or fracture. Panels formed from these metals are amenable to both laser and resistance welding and can be bonded by these or similar means.

Alternatively, or in addition, mechanical means such as by insertion of filamentary materials through the aligned apertures of the folded panels may be employed to interconnect the panel layers.

Textile

Figure 11:
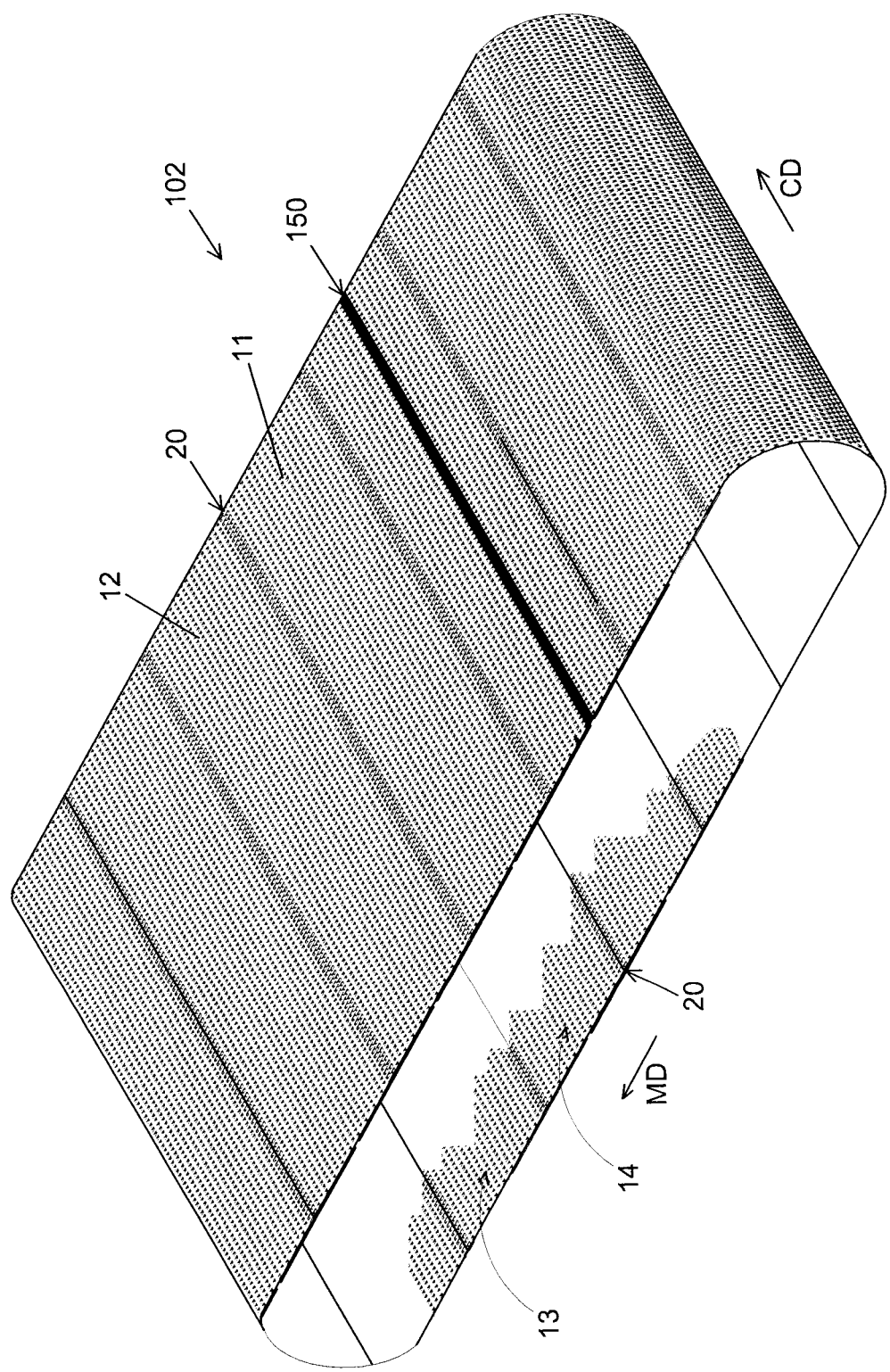
FIG. 11 illustrates a first embodiment of a double layer non-woven industrial textile constructed from a plurality of folded panels.

FIG. 11 is a perspective view of a first embodiment of a textile (102), made from a plurality of folded panels (11), (12), (13) and (14) as previously described. A seaming element (150) is used to join opposite ends of the textile (102) to form a continuous belt. The textile (102) comprises a plurality of folded panels (such as (11) and (12)) that are interconnected at seam regions (20) in an outer (or first) layer of the textile (102). An interior (or second) layer of the textile (102) comprises a plurality of folded panels (such as (13) and (14)) which are secured to folded panels (11) and (12) using any one of the methods previously described. The seam region (20) joining folded panels (11) and (12) is offset from the seam regions (20) joining folded panels (13) and (14) as follows. The seam regions (20) of the folded panels in the outer (or first) layer of the textile (102) are located over and in alignment with the protrusions in the central body regions of the folded panels of the inner (or second) layer of the textile (102). Similarly, the seam regions (20) of the folded panels in the inner (or second) layer of the textile (102) are located over and in alignment with the protrusions in the central body regions of the folded panels of the inner (or first) layer of the textile (102). The folded panels of the inner and outer layers of the textile (102) may be secured by bonding (for example, by TTLW if the panels comprise thermoplastic), or by insertion of a filamentary material across the textile width to form a mechanical interconnection as previously described. An open cell porous foam may be inserted between the inner and outer layers to either supplement or replace a welded or mechanical interconnection, as described in relation to FIGS. 9E and 9F.

As many folded panels (such as (11), (12), (13) and (14)) as needed are assembled and secured in the manner previously described in order to obtain a desired length of finished textile (102). Each layer of folded panels is oriented so that its seam regions are transverse to the intended run direction, or MD, of the finished textile (102). The textile (102) is then cut within a portion of the body regions of the folded panels to provide a desired finished length suitable for its intended use, while a seaming element (150) (such as described in US 2012/0040150, US 2014/0199510, US 2014/0053376 and WO 2014075170, all of which are incorporated herein by reference) is then used to join the opposed ends of the textile (102). The finished industrial textile (102) is thus a wholly nonwoven double layer assembly that includes a seam allowing for its installation and removal in the environment for which it is intended.

Figure 12:
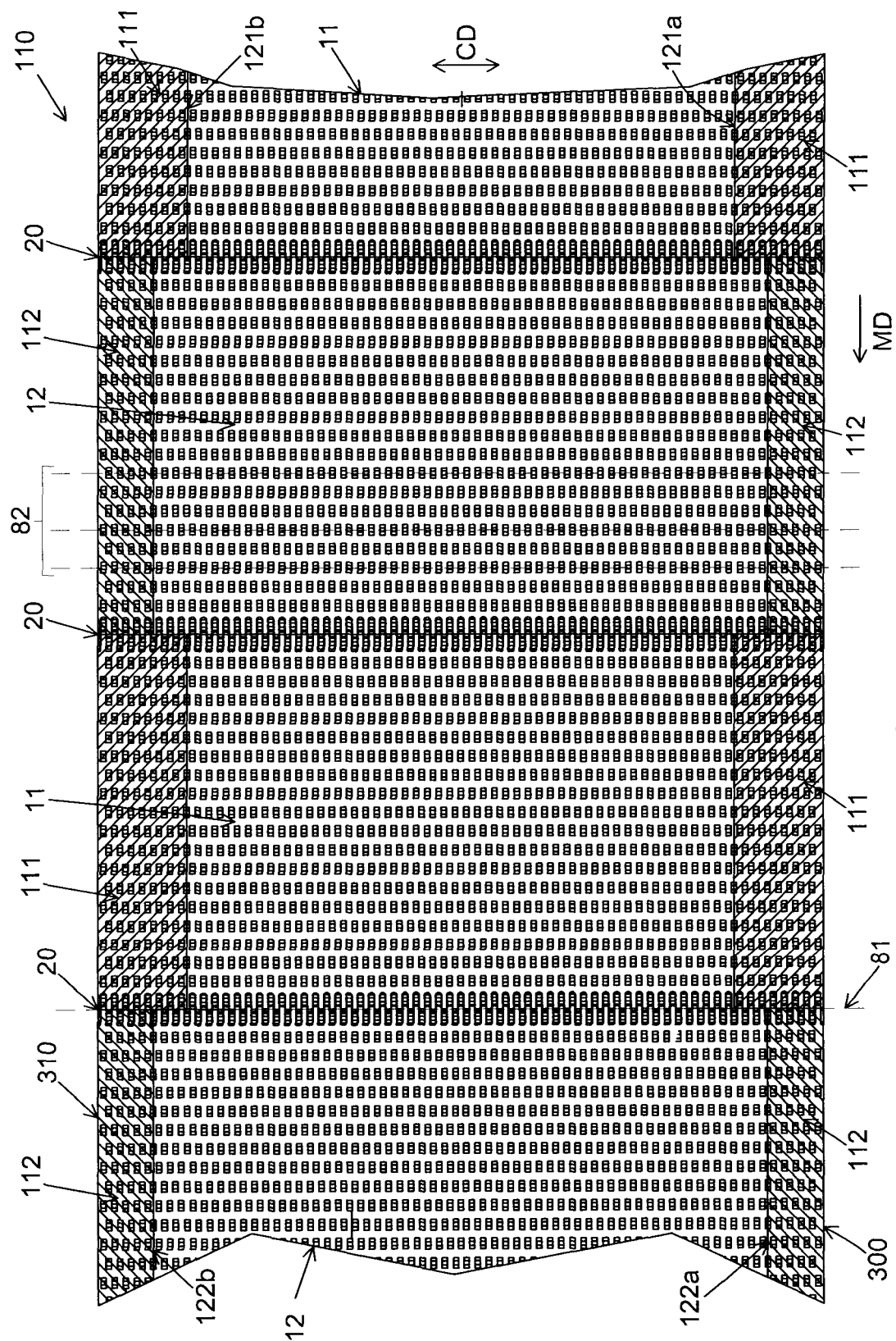
FIG. 12 is a top view of a second embodiment of a double layer non-woven industrial textile
Figure 13:
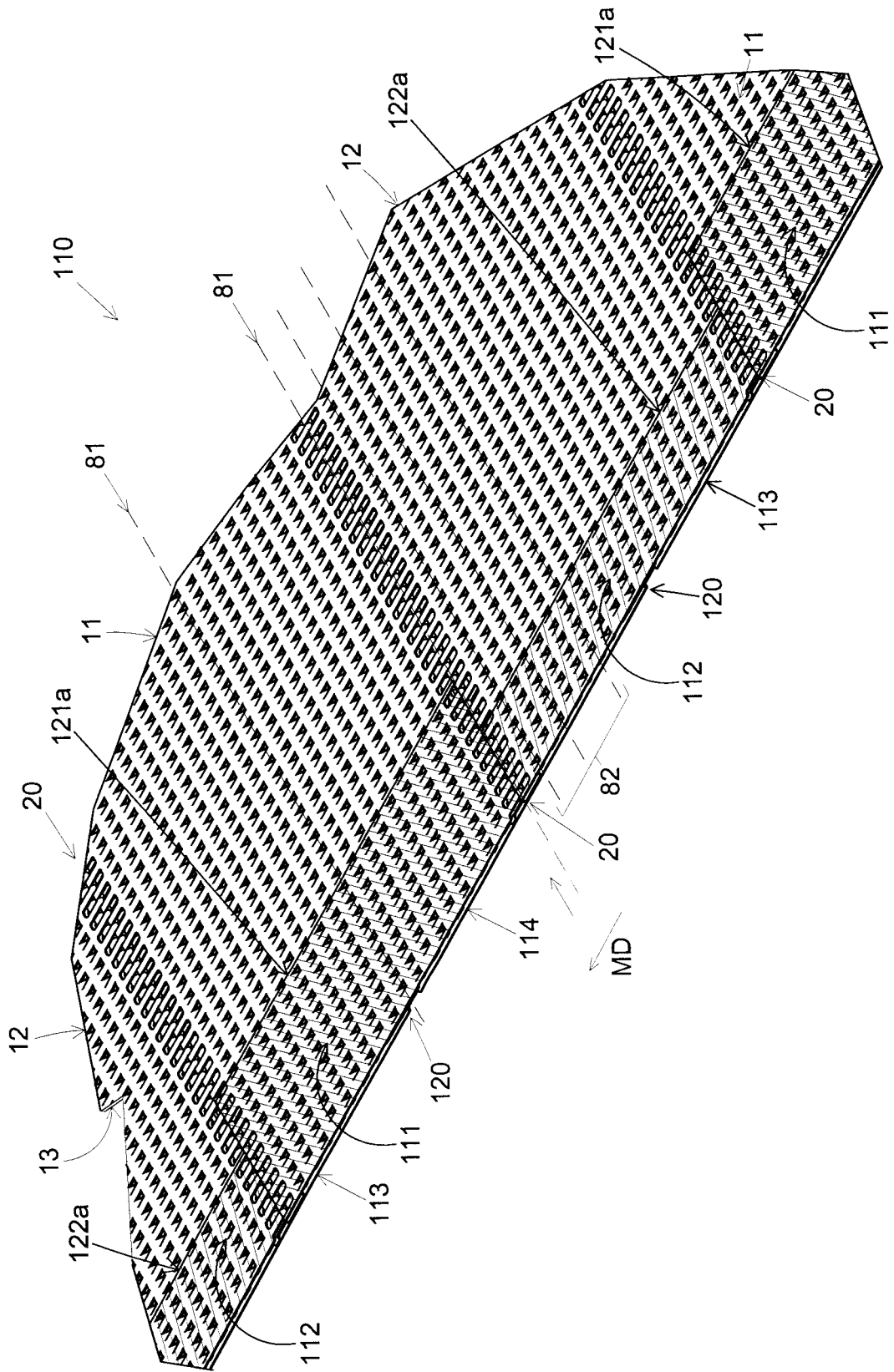
FIG. 13 is a perspective view of the double layer non-woven industrial textile shown in FIG. 12.

FIG. 12 is a top view of a second embodiment of a double layer non-woven industrial textile (110) assembled with panels previously described. FIG. 13 is a perspective view of textile (110) shown in FIG. 12. The industrial textile (110) includes folded panels (111, 112) that form at least one of the outside lateral edges (300, 310) of the textile (110). These "exterior" folded panels comprise material different from that used in the folded panels (11, 12) interior to the outside lateral edges (300, 310). Henceforth, folded panels (11) and (12) are referred to as "interior" folded panels, while folded panels (111) and (112) are referred to as "exterior" folded panels.

In particular, FIG. 12 illustrates a CD breadth of an exterior surface of the textile (110), that includes outer edges (300) and (310); and folded panels (11), (12), (111) and (112). The folded panels (11, 12, 111, and 112) can be constructed as described in FIGS. 1-10.

For example, if the textile (110) is intended for use in the dryer section of a papermaking machine, interior folded panels (11) and (12) may be formed from a film comprising polyethylene terephthalate (PET). This material is generally acceptable for such uses. However, in some high temperature environments where there is exposure to excess heat and humidity, the PET may degrade (hydrolyze). By using exterior folded panels (111, 112) that are formed from materials that are more heat and hydrolysis resistant (such as polyphenylene sulfide (PPS) or polyaryl ether ketones such as PEEK), it would be possible to provide longer life to the outer edges (300, 310) of the textile (110) that are exposed to direct heat in the dryer section.

In this embodiment, interior folded panel (11) is secured at its lateral edges (121a, 121b) to exterior folded panels (111). Similarly, interior folded panel (12) is secured at its lateral edges (122a, 122b) to exterior folded panels (112). In addition, adjacent lateral edges are offset from one another. That is, (121a) is offset from (122a), while (121b) is offset from (122b).

While the CD length of interior folded panels (11, 12) is unequal in FIG. 12, it is understood that adjacent interior folded panels can be equal in length, and can be aligned or offset from each other as required. Alternatively, there can be a random variation in the CD length of each the interior folded panels. In addition, across the MD breadth of the textile, adjacent lateral edges (121a, 121b); (122a, 122b) can be: i) offset in a pattern (as shown in FIG. 12) or randomly; ii) offset along one portion of the textile and aligned along a second portion; or iii) aligned throughout.

Securement of exterior and interior folded panels along the CD direction is described below in relation to FIG. 13.

The folded panels are interconnected in series along the MD direction as previously described. That is, by a series of seam regions (20) formed by intermeshing seam loops of adjacent folded panels. With reference to FIG. 12, seam loops of an interior panel (11, 12) interconnect with the seam loops of an exterior panel (111, 112), in addition to interconnection of exterior panels (111, 112) with each other, and interior panels (11, 12) with each other.

The connection between the exterior folded panels and the folded interior panels can be further reinforced by inserting one or more filamentary elements (82) through the aligned apertures of the interior and exterior folded panels (see FIG. 9B). Once assembled, the outer edges (300, 310) of the exterior panels (111, 112) are trimmed to remove any nonlinear variations and the outer edges (300, 310) are sealed by heat, chemical or other suitable means. This also prevents the filamentary element (82) from migrating outside the aligned apertures.

FIG. 13 is a perspective view of a portion of the industrial textile (110) shown in FIG. 12. In this view, the exterior panels (113, 114) of a second layer of the textile (110) are shown. Corresponding interior panels (13) and (14) (which are not visible) form a portion of the second layer of the industrial textile; interior panels (13) and (14) are located below and secured to the folded panels of the first layer in the arrangement previously described. Adjacent folded panels (13, 14, 113, 114) are interconnected at seam region (120). In this embodiment, interior folded panel (11) has a CD width that is different from adjacent interior folded panels (12). Similarly, interior folded panels (13) may have a CD width that differs from an adjacent interior folded panel (14).

As discussed above, exterior folded panels (113) and (114) are made from a material different from that of interior folded panels (13) and (14). In the example discussed above, where the interior folded panels (11, 12, 13, 14) comprise PET, exterior folded panels (111, 112, 113, 114) can comprise other materials such as PPS, PEEK, polyimides or a formable metal.

The exterior folded panels (111, 112, 113, 114) are attached to the exterior edges of textile (110) in the following manner.

First, interior folded panels (11, 12, 13, 14) are assembled as described above, except that adjacent lateral edges (121a, 121b) are not aligned, but instead laterally offset. At this stage, the outer MD edges are staggered as shown in FIG. 12. Exterior folded panels (111, 112, 113, 114) are then provided; these panels are formed from a material that differ from the material of the interior panels (11, 12, 13, 14). For example, the exterior folded panels can have greater resistance to environmental degradation when in use.

A first edge of each exterior panel is brought into alignment and contacted with an outer edge of a corresponding interior folded panel. For example, exterior folded panel (111) is brought into alignment and contact with lateral edge (121a) of interior folded panel (11). A portion of the seam loops of exterior folded panel (111) are intermeshed with the offset seam loops of adjacent interior folded panels (12) on either side of (111), thereby forming a continuous seam channel (e.g. (80) as shown in FIG. 6) through each seam region (20). Similarly, exterior folded panel (112) is brought into contact and aligned with the lateral edge (122a) of interior folded panel (12), while intermeshing with the seam loops of adjacent exterior panel (111), thereby completing the continuous seam channel through the seam region (20). This is repeated across the MD direction until a desire MD length of the textile (110) is achieved. The same procedure is repeated along the lateral edges (121b, 122b). Once the seam channel in each seam region is complete, a connecting member, such as a pin, pintle, or like-element, can be inserted into the land channel (as shown in FIG. 7) along the entire CD breadth.

The same procedure is carried out in the second layer of folded interior (13, 14) and folded exterior (113, 114) panels.

The connection between the exterior folded panels and the folded interior panels can be further reinforced by inserting a filamentary element (such as (82) shown in FIG. 9B) through the aligned apertures of the interior and exterior folded panels in the manner described above. Any excess material along the outer MD edges (300, 310) of the textile (110) can then be trimmed. The outer edges can be sealed so as to retain the filamentary element (82) within the aligned apertures.

CONCLUSION

Although the panel and textile (constructed from these panels) have been described through the use of exemplary embodiments, it will be appreciated by those of skill in the art that various modifications may be made to the described embodiments that fall within the scope and spirit of the invention as defined by the claims and their equivalents appended hereto. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

PARTS LIST

| Part number | Item |
| --- | --- |
| 1 | Panel |
| 10, 11, 12, 13, 14 | Folded panels |
| 111, 112, 113, 114 | Folded panels |
| 20 | seam region |
| 21a, 21b | loop strips |
| 21a | loop strips of 11 |
| 21b | loop strips of 12 |
| 27a, 27b | fold lines |
| 28a, 28b | inner edges |
| 29a, 29b | out edeges of panel |
| 30a, 30b | fold regions |
| 31, 32 | fold regions of folded panel 11 |
| 33, 34 | fold regions of folded panel 12 |
| 35, 36 | fold regions of folded panel 13 |
| 41a, 41b | slots |
| 41a | slots of 11 |
| 41b | slots of 12 |
| 45 | striatons |
| 51 | surface of 57, 58, 59 |
| 52 | side surface |
| 53 | land area of 1, 10, 12, 13 |
| 55 | aperture |
| 56 | land channel |
| 57 | protrusions of panel 1, 10, 11 |
| 57a, 57b | protrusions proximate 30a, 30b |
| 58, 59 | protrusions of folded panel 12, 13 |
| 60 | foam |
| 65 | body region |
| 70a, 70b | bonding of edge region to land channel |
| 71a, 71b | bonding of protrusion surface to land area |
| 72a, 72b | bonding of rope hem to 11, 12 |
| 73a | bonding of spacer member to land area |
| 73b | bonding of spacer member to edge region |
| 75 | spacer member |
| 80 | seam channel |
| 81 | connecting member |
| 82 | filamentary element |
| 83a | portion of fold region 32 for rope hem |
| 83b | portion of fold region 33 for rope hem |
| 85a, 85b | edge regions |
| 85a | edge region of folded panel 11 |
| 85b | edge region of folded panel 12 |
| 100 | textile embodiment |
| 101 | textile embodiment |
| 102 | textile embodiment |
| 110 | textile embodiment |
| 120 | seam region in 110 |
| 121a, 121b | lateral edges of 11 |
| 122a, 122b | lateral edges of 12 |
| 150 | seaming element |
| 300, 310 | outside lateral edges of 110 |

The invention claimed is:

1. A panel for use in construction of a non-woven industrial textile, the panel comprising:
   a) an outer surface and an inner surface;
   b) first and second fold regions, the first fold region located at a first end of the panel, the second fold region located at a second end of the panel, each fold region comprising:
      i) an outer edge of the panel;
      ii) an edge region;
      iii) a column of loop strips and slots, the column oriented parallel to the outer edge and set adjacent the edge region; and iv) a fold line substantially midway through the column of loop strips and slots, oriented parallel to the outer edge; and c) a body region between the first and second fold regions; wherein:

the inner surface of the body region comprises a plurality of protrusions, with a land area between each protrusion;

the panel is folded along each fold line such that each edge region is oriented towards the inner surface of the panel, thereby forming a folded panel in which each loop strip forms a seam loop, and each slot forms a seam loop-receiving opening for receipt of a seam loop of an adjacent folded panel; and at least one slot is dimensioned to receive at least one of the protrusions.

2. The panel according to claim 1, wherein the plurality of protrusions are arranged in a series of columns parallel to the column of loop strips and slots in each fold region.

3. The panel according to claim 1, wherein each protrusion includes a surface parallel to the inner surface of the panel.

4. The panel according to claim 1, wherein each protrusion includes at least one lateral aperture.

5. The panel according to claim 1, wherein each slot is aligned with a corresponding protrusion proximate the fold region.

6. The panel according to claim 1, wherein each edge region is secured to the inner surface of the folded panel.

7. The panel according to claim 1, wherein in the folded panel, each fold region is folded in a U-shape.

8. The panel according to claim 7, wherein a spacer member is secured within at least one fold region.

9. The panel according to claim 1, comprising a thermoplastic material, a thermoset material or a formable metal.

10. The panel according to claim 9, wherein the panel further comprises an additive, a radiant-energy absorbent material, or a combination thereof.

11. A double-layer non-woven industrial textile having a first layer opposite a second layer, the first layer and the second layer each assembled from a plurality of folded panels secured adjacently in series, wherein:

a) each folded panel comprises a body region in between two fold regions, the first fold region located at a first end of the folded panel, the second fold region located at a second end of the folded panel, the body region comprising a plurality of protrusions on an inner surface of the folded panel; and each fold region having a plurality of slots, seam loops and seam loop-receiving openings;

b) adjacent folded panels are interconnected at a seam region, the seam region formed by insertion of the seam loops of a first folded panel into the seam loop-receiving openings of a second folded panel and the seam loops of the second folded panel into the seam loop-receiving openings of the first folded panel, thereby forming a seam channel at the seam region;

c) a central portion of the body region of each folded panel in the first layer overlaps a seam region in the second layer and a central portion of the body region of each folded panel in the second layer overlaps a seam region in the first layer;

d) at least one slot in the first layer is dimensioned to receive at least one of the protrusions in the second layer and/or at least one slot in the second layer is dimensioned to receive at least one of the protrusions in the first layer;

e) adjacent folded panels are secured to each other by:

i) insertion of a connecting member in the seam channel between the adjacent folded panels; and/or ii) securing: an edge region of each fold region in the first layer to the inner surface of the second layer; and an edge region of each fold region in the second layer to the inner surface of the first layer; and f) the first and second layers are secured together by at least one of:

i) securing a plurality of protrusions in the first layer with opposite land areas in the second layer; and ii) securing a plurality of protrusions in the second layer with opposite land areas in the first layer.

12. The double-layer non-woven industrial textile of claim 11, wherein each fold region in the first layer is bonded to the inner surface of the first layer and each fold region in the second layer is bonded to the inner surface of the second layer, and adjacent folded panels are secured to each other by insertion of the connecting member in the seam channel between the adjacent folded panels.

13. The double-layer non-woven industrial textile of claim 11, wherein each fold region is folded into a U-shape and adjacent folded panels are secured to each other by securing:

a) the edge region of each fold region in the first layer to the inner surface of the second layer; and b) the edge region of each fold region in the second layer to the inner surface of the first layer.

14. The double-layer non-woven industrial textile of claim 13, wherein a spacer member is secured within at least one fold region.

15. The double-layer non-woven industrial textile of claim 11, wherein each protrusion includes two lateral apertures, and the first and second layers are further secured by a filamentary element that passes through aligned apertures of a column of protrusions in the first layer staggered with a column of protrusion in the second layer.

16. The double-layer non-woven industrial textile of claim 11, wherein the first and second layers are further secured by insertion of a foam in between the first and second layers.

17. The double-layer non-woven industrial textile according to claim 11, wherein each folded panel comprises a thermoplastic material, a thermoset material or a formable metal.

18. The double-layer non-woven industrial textile according to claim 17, wherein each folded panel further comprises an additive, a radiant-energy absorbent material, or a combination thereof, and laser welding is used to secure components of each folded panel.

19. The double-layer non-woven industrial textile according to claim 11, wherein each folded panel has a first and second lateral edge; additional exterior folded panels are secured to at least one of the first and second lateral edges, such that the material of the additional exterior folded panels is different from the material of each folded panel.

20. A panel for use in construction of a non-woven industrial textile, the panel comprising:

a) an outer surface and an inner surface;

b) first and second fold regions, the first fold region located at a first end of the panel, the second fold region located at a second end of the panel, each fold region comprising:

i) an outer edge of the panel;
ii) an edge region;
iii) a column of loop strips and slots, the column oriented parallel to the outer edge and set adjacent the edge region; and
iv) a fold line substantially midway through the column of loop strips and slots, oriented parallel to the outer edge;
and
c) a body region between the first and second fold regions;
wherein:
the panel is folded along each fold line such that each edge region is oriented towards the inner surface of the panel, thereby forming a folded panel in which each loop strip forms a seam loop, and each slot forms a seam loop-receiving opening for receipt of a seam loop of an adjacent folded panel;
the inner surface of the body region comprises a plurality of protrusions, each protrusion having at least one aperture; and a land area between each protrusion;
at least one slot is dimensioned to receive at least one of the protrusions; and
the panel comprises at least one layer of polymer film of oriented PET which includes a radiant-energy absorbing material.

* * * * *